(12) United States Patent
Saito

(10) Patent No.: US 6,201,894 B1
(45) Date of Patent: Mar. 13, 2001

(54) METHOD AND APPARATUS FOR EXTRACTING RULED LINES OR REGION SURROUNDING RULED LINES

(75) Inventor: Kazuyuki Saito, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/786,913

(22) Filed: Jan. 22, 1997

(30) Foreign Application Priority Data

| Jan. 23, 1996 | (JP) | 8-009554 |
| Jan. 24, 1996 | (JP) | 8-010044 |
| Jan. 24, 1996 | (JP) | 8-010045 |
| Jan. 24, 1996 | (JP) | 8-010046 |

(51) Int. Cl.$^7$ ............................................. G06K 9/34
(52) U.S. Cl. ........................................ 382/176; 382/175
(58) Field of Search .................................. 382/173–174, 382/175–180, 190, 195, 198–200, 282, 283, 286, 312, 317, 305, 306; 358/453, 462, 296; 707/500, 509–510, 517, 520–524, 526, 908

(56) References Cited

U.S. PATENT DOCUMENTS

| 5,140,650 | * | 8/1992  | Casey et al.     | 382/283 |
| 5,416,849 | * | 5/1995  | Huang            | 382/317 |
| 5,430,808 | * | 7/1995  | Baird et al.     | 382/176 |
| 5,555,362 | * | 9/1996  | Yamashita et al. | 382/173 |
| 5,748,809 | * | 5/1998  | Hirsch           | 382/317 |
| 5,848,186 | * | 12/1998 | Wang et al.      | 382/176 |

OTHER PUBLICATIONS

Sato et al, "F6365 Japanese Document Reader," Fujitsu Scientific & Technical Journal, vol. 26, No. 3, Autumn 1990, pp 224–233, Oct. 1990.*

Chang et al, Rule–Based System for Chinese Newspaper Segmentation, Signal Processing VI: Theories and Applications, pp 615–618, Aug. 1992.*

* cited by examiner

*Primary Examiner*—Bhavesh Mehta
(74) *Attorney, Agent, or Firm*—Fitzpatrick, Cella, Harper & Scinto

(57) ABSTRACT

A family register document is divided into a plurality of regions, and the type of family register document is identified on the basis of the features of the divided regions. The division result is checked on the basis of stored format information of the family register document corresponding to the identified type. In accordance with another embodiment of the invention, after a family register document is divided into a plurality of regions, characters present in the divided regions are recognized. The recognition result is compared with stored character information, and the type of family register document is identified based on a result of this comparison. According to another embodiment of the invention, ruled lines included in a family register document are extracted, and the type of family register document is identified based on features of the extracted ruled lines. The extraction result is checked based on format information of the family register document corresponding to the identified type. Furthermore, the discrimination result is informed. In a further embodiment, after a family register document is divided into a plurality of regions, and the type of family register document is identified based on features of the divided regions, format information of the family register document corresponding to the identified type is assigned to each of the divided regions, and characters present in the assigned regions are recognized.

24 Claims, 37 Drawing Sheets

FIG.4A

| FORMAT TYPE | ID |
|---|---|
| PAGE TYPE = HEAD TYPE | 1000 |
| PAGE TYPE = NON-HEAD TYPE | 2000 |

FIG.4B

| FORMAT TYPE | ID |
|---|---|
| PERSON LISTED ON PAGE OF HEAD | 000 |
| FIRST PERSON LISTED ON PAGE OF NON-HEAD | 100 |
| SECOND PERSON LISTED ON PAGE OF NON-HEAD | 200 |

FIG.4C

| ITEM NAME | ID |
|---|---|
| TITLE "本籍" (BIRTH PLACE) | 10 |
| ADDRESS | 11 |
| TITLE "氏名" (NAME) | 12 |
| NAME OF HEAD | 13 |
| COMPILED PARTICULARS | 20~ |
| TITLE "父" (FATHER) | 30 |
| NAME OF FATHER | 31 |
| TITLE "母" (MOTHER) | 32 |
| NAME OF MOTHER | 33 |
| FAMILY RELATIONSHIP | 34 |
| TITLE "養父" (ADOPTIVE FATHER) | 40 |
| NAME OF ADOPTIVE FATHER | 41 |
| TITLE "養母" (ADOPTIVE MOTHER) | 42 |
| NAME OF ADOPTIVE MOTHER | 43 |
| ADOPTED CHILD FAMILY RELATIONSHIP | 44 |
| TITLE "夫" (HUSBAND) OR "妻" (WIFE) | 50 |
| NAME OF MARRIED PERSON | 51 |
| NAME OF UNMARRIED PERSON | 60 |
| TITLE "出生" (BIRTH) | 70 |
| DATE OF BIRTH | 71 |
| DATE OF ISSUING MARRIAGE CERTIFICATE DATA | 80~ |

FIG. 5

| |
|---|
| KEY 0<br>BLOCK WITH TITLE "本籍" (BIRTH PLACE) |
| KEY 1<br>BLOCK IN FIRST LINE OF COLUMN LISTING COMPILED PARTICULARS |
| KEY 2<br>BLOCK IN FIRST LINE OF COLUMN LISTING DATE<br>OF ISSUING MARRIAGE CERTIFICATE DATA AND THE LIKE |
| KEY 3<br>BLOCK WITH TITLE "父" (FATHER) |
| KEY 4<br>BLOCK IN FIRST LINE OF COLUMN LISTING DATE OF ISSUING<br>MARRIAGE CERTIFICATE DATA AND THE LIKE OF SECOND PERSON |
| KEY 5<br>BLOCK WITH TITLE "父" (FATHER) OF SECOND PERSON |

FIG. 11

| | | | | | | | | | | 本籍 | 東京都大田区下丸子三丁目三十番地 |
|---|---|---|---|---|---|---|---|---|---|---|---|
| | | | | | | | | 平成百年四月拾参日編製 | | | |
| | | | | 平成四拾五年五月六日町田市で出生同月拾弐日父届出入籍 | | | | | | | |
| | | | 平成六拾五年壱月拾弐日冬野夏子婚姻届出町田市某町四百五十六番地豊臣秀吉戸籍から入籍 | | | | | | | | |
| | | 平成葉百年四月拾参日妻とともに東京都太田区下丸子参丁目三十番地徳川家康同人妻家子の養子となる縁組届出町田某町三百四十五番地豊臣太郎戸籍から入籍 | | | | | | | | | |
| 出生 | 夫 | 養母 | 養父 | 母 | 父 | | | | | 氏名 | 徳川　太郎 |
| 平成四十五年五月六日 | 太郎 | 家子 | 徳川家康養子 | 豊臣秀子男 | 豊臣秀吉二 | | | | | | |

FIG. 14

|  |  |  |  |  |  |  |  |  |  |  | 本 籍 | —1401 |
|---|---|---|---|---|---|---|---|---|---|---|---|---|
|  |  |  |  | 目三十番地徳川家康同人妻家子の養子となる縁組届出町田某町三百四十五番地豊臣太郎戸籍から入籍 | 平成百五年四月拾参日妻とともに東京都太田区下丸子参丁 | 五十六番地豊臣秀吉戸籍から入籍 | 平成六拾五年壱月拾弐日冬野夏子婚姻届出町田市某町四百 | 平成四拾五年五月六日町田市で出生同月拾弐日父届出入籍 |  |  | 平成百年四月拾参日編製 | 東京都大田区下丸子三丁目三十番地 |
|  |  |  |  |  |  |  |  |  |  |  |  | —B1402 |
| 出生 | 夫 | 養母 | 養父 | 母 | 父 |  |  |  |  |  | 氏 名 | —B1403 |
| 平成四十五年五月六日 | 太郎 | 徳川 家子 | 徳川 家康 | 豊臣 秀子 | 豊臣 秀吉 |  |  |  |  |  | 徳川　太郎 | —B1404 |
|  |  | 養子 | | 二男 | | | | | | | | |

FIG. 18

| KEYWORD | LOWER 2 DIGITS OF CORRESPONDING ITEM IDENTIFICATION ID |
|---|---|
| "本籍" (BIRTH PLACE) | 10 |
| "氏名" (NAME) | 12 |
| "父" (FATHER) | 30 |
| "母" (MOTHER) | 32 |
| "養父" (ADOPTIVE FATHER) | 40 |
| "養母" (ADOPTIVE MOTHER) | 42 |
| "出生" (BIRTH) | 70 |

FIG. 19

| ADDRESS TO BLOCK DATA | RECOGNITION RESULT | LOWER 2 DIGITS OF CORRESPONDING ITEM IDENTIFICATION ID |
|---|---|---|
| BLOCK 1 | 本籍 | 0 |
| BLOCK 2 | 東京都大田区下丸子三丁目三十番地 | 0 |
| BLOCK 3 | 氏名 | 0 |
| ... | ... | 0 |
| BLOCK n | 平成四十五年五月六日 | 0 |

FIG. 20

| ADDRESS TO BLOCK DATA | RECOGNITION RESULT | LOWER 2 DIGITS OF CORRESPONDING ITEM IDENTIFICATION ID |
|---|---|---|
| BLOCK 1 | 本籍 | 10 |
| BLOCK 2 | 東京都大田区下丸子三丁目三十番地 | 0 |
| BLOCK 3 | 氏名 | 12 |
| ... | ... | 0 |
| BLOCK n | 平成四十五年五月六日 | 0 |

FIG. 21

| KEYWORD | LOWER 2 DIGITS OF CORRESPONDING ITEM IDENTIFICATION ID |
|---|---|
| "本籍" (BIRTH PLACE) | 10 |
| "籍本" (ECALP HTRIB) | 10 |
| "氏名" (NAME) | 12 |
| "名氏" (EMAN) | 12 |
| "父" (FATHER) | 30 |
| "母" (MOTHER) | 32 |
| "養父" (ADOPTIVE FATHER) | 40 |
| "父養" (REHTAF EVITPODA) | 40 |
| "養母" (ADOPTIVE MOTHER) | 42 |
| "母養" (REHTOM EVITPODA) | 42 |
| "出生" (BIRTH) | 70 |
| "生出" (HTRIB) | 70 |

FIG. 22

| KEYWORD | LOWER 2 DIGITS OF CORRESPONDING ITEM IDENTIFICATION ID |
|---|---|
| "本籍" (BIRTH PLACE) | 10 |
| "氏名" (NAME) | 12 |
| "父" (FATHER) | 30 |
| "母" (MOTHER) | 32 |
| "養父" (ADOPTIVE FATHER) | 40 |
| "養母" (ADOPTIVE MOTHER) | 42 |
| "出生" (BIRTH) | 70 |
| 夫" (HUSBAND) | 50 |
| 妻" (WIFE) | 50 |

FIG. 23
FIRST CANDIDATE :    本簿
SECOND CANDIDATE :   木摘
THIRD CANDIDATE :    来籍
FOURTH CANDIDATE :   基描
 : CHARACTER MATCHING WITH KEYWORD

FIG. 26

| | | 養父 | 養母 | 夫 | 出生 |
|---|---|---|---|---|---|
| 本籍 | 東京都大田区下丸子三丁目三十番地 | | | | |
| 平成百年四月拾参日編製 | | | | | |
| 平成四拾五年五月六日町田市で出生同月拾弐日父届出入籍 | | | | | |
| 平成六拾五年壱月拾弐日冬野夏子婚姻届出町田市某町四百五十六番地豊臣秀吉戸籍から入籍 | | | | | |
| 平成葉百年四月拾参日妻とともに東京都大田区下丸子参丁目三十番地徳川家康同人妻家子の養子となる縁組届出町田某町三百四十五番地豊臣太郎戸籍から入籍 | | | | | |
| 氏名 | 徳川 太郎 | 豊臣 秀吉 | 豊臣 秀子 | 徳川 家康 | 徳川 家子 | 太郎 | 平成四十五年五月六日 |

|  | 父 | 母 | 養父 | 養母 | 夫 | 出生 |
|---|---|---|---|---|---|---|
| 本籍 東京都大田区下丸子三丁目三十番地 |  |  |  |  |  |  |
| 平成百年四月拾参日編製 |  |  |  |  |  |  |
| 平成四拾五年五月六日町田市で出生同月拾弐日父届出入籍 |  |  |  |  |  |  |
| 平成六拾五年壱月拾弐日冬野夏子婚姻届出町田市某町四百五十六番地豊臣秀吉戸籍から入籍 |  |  |  |  |  |  |
| 平成葉百年四月拾参日妻とともに東京都大田区下丸子参丁目三十番地徳川家康同人妻家子の養子となる縁組届出町田某町三百四十五番地豊臣太郎戸籍から入籍 |  |  |  |  |  |  |
| 氏 名 徳川 太郎 | 豊臣 秀吉 二男 | 秀子 | 徳川 家康 | 家子 養子 | 太郎 | 平成四十五年五月六日 |

| ITEM NAME | ID | WRITTEN DIRECTION (1: VERTICAL WRITING, 2: HORIZONTAL WRITING) |
|---|---|---|
| TITLE "本籍" (BIRTH PLACE) | 10 | 2 |
| ADDRESS | 11 | 1 |
| TITLE "氏名" (NAME) | 12 | 2 |
| NAME OF HEAD | 13 | 1 |
| COMPILED PARTICULARS | 20~ | 1 |
| TITLE "父" (FATHER) | 30 | 2 |
| NAME OF FATHER | 31 | 1 |
| TITLE "母" (MOTHER) | 32 | 2 |
| NAME OF MOTHER | 33 | 1 |
| FAMILY RELATIONSHIP | 34 | 2 |
| TITLE "養父" (ADOPTIVE FATHER) | 40 | 2 |
| NAME OF ADOPTIVE FATHER | 41 | 1 |
| TITLE "養母" (ADOPTIVE MOTHER) | 42 | 2 |
| NAME OF ADOPTIVE MOTHER | 43 | 1 |
| ADOPTED CHILD FAMILY RELATIONSHIP | 44 | 2 |
| TITLE "夫" (HUSBAND) OR "妻" (WIFE) | 50 | 2 |
| NAME OF MARRIED PERSON | 51 | 1 |
| NAME OF UNMARRIED PERSON | 60 | 1 |
| TITLE "出生" (BIRTH) | 70 | 2 |
| DATE OF BIRTH | 71 | 1 |
| DATE OF ISSUING MARRIAGE CERTIFICATE DATA | 80~ | 1 |

METHOD AND APPARATUS FOR EXTRACTING RULED LINES OR REGION SURROUNDING RULED LINES

BACKGROUND OF THE INVENTION

The present invention relates to an image processing apparatus and method, which extract ruled lines included in an original image having a predetermined format or a region surrounded by the ruled lines.

Also, the present invention relates to a character recognition apparatus and method, which recognize characters present in a region surrounded by ruled lines included in an original image having a predetermined format, and an image recognition apparatus and method, which recognize the format of an input original image.

In a conventional image processing apparatus which extracts a region surrounded by ruled lines included in an original image, as the method of extracting the region, the original image is divided in units of regions surrounded by ruled lines. The coordinate positions of the regions surrounded by the ruled lines obtained by the region division processing are acquired, and the regions surrounded by the ruled lines are extracted based on the acquired coordinate positions.

When a region surrounded by ruled lines in an original image is to be extracted, each region surrounded by ruled lines is extracted using image data obtained by reading the original image by, e.g., a scanner.

When characters present in a region surrounded by ruled lines included in an original image as an object to be processed of the image processing apparatus are to be recognized, only characters present in regions of an original image having a specific format with a predetermined layout of regions can only be recognized.

However, since the conventional image processing apparatus extracts regions surrounded by ruled lines included in image data of an original image on the basis of the coordinate positions, if the original image is read at an offset position, the coordinate position of each region to be extracted surrounded by the ruled lines also offsets, and a desired region cannot be accurately extracted.

In order to extract a desired region surrounded by ruled lines included in an original image, a method of extracting all the regions surrounded by the ruled lines included in the original image and extracting the desired region after regions other than the desired region are deleted is available. Alternatively, a method of extracting a desired region surrounded by ruled lines by designating the desired region to be distinguished from other regions surrounded by ruled lines before reading an original image is also available. However, either method requires a user to perform cumbersome manual operations to extract the region, thus lowering the extraction processing efficiency.

Even when a desired region surrounded by ruled lines can be extracted by region division processing, the presence/absence of region division processing errors must be visually checked by the operator.

Also, even when a desired region surrounded by ruled lines included in an original image is to be extracted as one of items constituting the original image, if region division processing errors have occurred, a wrong item may be extracted.

When characters present in a region surrounded by ruled lines included in an original image are to be recognized, such recognition method cannot be applied to original images having a plurality of different formats, resulting in poor compatibility.

For this reason, in order to recognize characters present in regions included in original images having a plurality of different formats in place of a specific format, image recognition that can recognize the format of an original image is also required.

In order to read characters included in a region surrounded by ruled lines included in an original image having a specific format using, e.g., a scanner, the reading position must be accurately determined, resulting in cumbersome operations in character recognition processing.

SUMMARY OF THE INVENTION

The present invention has been made in consideration of the above-mentioned problems and has as its object to provide an image processing apparatus and method, which can easily check the presence/absence of processing errors of region division processing, and can easily correct the processing errors if they are found.

It is another object of the present invention to provide an image processing apparatus and method, which can improve the operation efficiency in the region division processing.

In order to achieve the above object, an image processing apparatus according to the present invention comprises the following arrangement.

That is, an image processing apparatus for extracting regions in units of attributes included in an original image having a predetermined format, comprises:

storage means for storing format information associated with the predetermined format;

division means for dividing the original image having the predetermined format into a plurality of regions; and discrimination means for checking a division result of the division means on the basis of the format information.

In order to achieve the other object, an image processing apparatus according to the present invention comprises the following arrangement.

That is, an image processing apparatus for extracting regions in units of attributes included in an original image having a predetermined format, comprises:

storage means for storing format information associated with each of original images having a plurality of different predetermined formats;

division means for dividing the original image having the predetermined format into a plurality of regions;

identification means for identifying a type of original image having the predetermined format on the basis of features of the regions divided by the division means; and discrimination means for checking a division result of the division means on the basis of the format information of an original image having the predetermined format corresponding to the type identified by the identification means.

The apparatus preferably further comprises correction means for, when a discrimination result of the discrimination means indicates that the division result of the division means includes an error, correcting the error of the division result. When the apparatus comprises the correction means, the division result errors can be corrected.

The apparatus preferably further comprises display means for displaying a discrimination result of the division result of the division means by the discrimination means. When the apparatus comprises the display means, the user can be informed whether or not the division results include errors.

The apparatus preferably further comprises information means for, when a discrimination result of the discrimination means indicates that the division result of the division means includes an error, giving message information indicating the error. When the apparatus comprises the information means, the user can be informed that the division results include errors.

Each of the regions is preferably a rectangular region surrounded by ruled lines.

The apparatus preferably further comprises display means for, when a discrimination result of the discrimination means indicates that the division result of the division means includes an error, displaying the region which may have caused the error of the division result to be distinguished from the regions free from the error of the division result. When the region which may have caused the division result errors is displayed to be distinguished from those free from any errors, the user can easily recognize such region.

In order to achieve the above object, an image processing method according to the present invention comprises the following arrangement.

More specifically, an image processing method for extracting regions in units of attributes included in an original image having a predetermined format, comprises:

the storage step of storing format information associated with the predetermined format in a storage medium;

the division step of dividing the original image having the predetermined format into a plurality of regions; and the discrimination step of checking a division result in the division step on the basis of the format information.

In order to achieve the other object, an image processing method according to the present invention comprises the following arrangement.

That is, an image processing method for extracting regions in units of attributes included in an original image having a predetermined format, comprises:

the storage step of storing, in a storage medium, format information associated with each of original images having a plurality of different predetermined formats;

the division step of dividing the original image having the predetermined format into a plurality of regions;

the identification step of identifying a type of original image having the predetermined format on the basis of features of the regions divided in the division step; and the discrimination step of checking a division result in the division step on the basis of the format information of an original image having the predetermined format corresponding to the type identified in the identification step.

As is apparent from the above description, according to the present invention, an image processing apparatus and method, which can easily discriminate the presence/absence of processing errors in the region division processing, and can easily correct processing errors when such errors are found, can be provided.

Also, an image processing apparatus and method which can improve the operation efficiency in the region division processing can be provided.

The present invention has been made in consideration of the above-mentioned problems and has as its object to provide an image processing apparatus and method, which can extract a desired region surrounded by ruled lines included in an original image.

It is another object of the present invention to provide an image processing apparatus and method, which can improve operation efficiency in the extraction processing of a region surrounded by ruled lines included in an original image.

In order to achieve the above objects, an image processing apparatus according to the present invention comprises the following arrangement.

That is, an image processing apparatus for extracting a region surrounded by ruled lines included in an original image having a predetermined format, comprises:

storage means for storing format information including character information in a predetermined region in each of original images having a plurality of different formats;

division means for dividing the original image having the predetermined format into a plurality of regions;

recognition means for recognizing characters present in the regions divided by the division means;

comparison means for comparing a recognition result with the character information; and identification means for identifying a type of original image having the predetermined format on the basis of a comparison result of the comparison means.

The apparatus preferably further comprises assignment means for assigning format information of an original image having the predetermined format corresponding to the type identified by the identification means to the regions of the original image divided by the division means.

Preferably, the identification means identifies the type of original image having the predetermined format on the basis of a relative positional relationship among the plurality of regions divided by the division means when no recognition result that matches the character information is available as a result of comparison by the comparison means.

The character information preferably indicates a character string having a predetermined written direction.

The character information preferably indicates a character string having a predetermined written direction and a character string having a direction opposite to the predetermined written direction. When such character information is used, the recognition means need not consider the written direction of characters to be recognized.

The apparatus preferably further comprises registration means for further registering the recognition result of the recognition means present in a region other than the predetermined region in the storage means as new character information.

Also, the apparatus preferably further comprises display means for displaying the recognition result that matches the character information by the comparison means to be distinguished from other recognition results. As the recognition result that matches character information is displayed to be distinguished from other recognition results, whether or not correct recognition results are obtained can be discriminated, for example, when density adjustment failures or the like upon reading an image impair the recognition rate, and character candidates of the recognition results do not include any right-answer characters.

In order to achieve the above objects, an image processing method according to the present invention comprises the following arrangement.

That is, an image processing method for extracting a region surrounded by ruled lines included in an original image having a predetermined format, comprises:

the storage step of storing, in a storage medium, format information including character information in a predetermined region in each of original images having a plurality of different formats;

the division step of dividing the original image having the predetermined format into a plurality of regions;

the recognition step of recognizing characters present in the regions divided in the division step;

the comparison step of comparing a recognition result with the character information; and the identification step of identifying a type of original image having the predetermined format on the basis of a comparison result in the comparison step.

As is apparent from the above description, according to the present invention, an image processing apparatus and method, which can extract a desired region surrounded by ruled lines included in an original image, can be provided.

Also, an image processing apparatus and method, which can improve operation efficiency in the extraction processing of a region surrounded by ruled lines included in an original image, can be provided.

The present invention has been made in consideration of the above-mentioned problems and has as its object to provide an image processing apparatus and method, which can always accurately extract ruled lines by correcting processing errors generated in the ruled line extraction processing for extracting ruled lines included in an original image, and can eliminate processing errors generated in the region division processing by performing the region division processing on the basis of the extracted ruled lines.

In order to achieve the above object, an image processing apparatus according to the present invention comprises the following arrangement.

That is, an image processing apparatus for extracting ruled lines included in an original image having a predetermined format, comprises:

storage means for storing format information associated with the predetermined format;

extraction means for extracting ruled lines included in an original image having the predetermined format;

discrimination means for checking an extraction result of the extraction means on the basis of the format information; and information means for giving information on the basis of a discrimination result of the discrimination means.

In order to achieve the above object, an image processing apparatus according to the present invention comprises the following arrangement.

More specifically, an image processing apparatus for extracting ruled lines included in an original image having a predetermined format, comprises:

storage means for storing format information associated with each of original images having a plurality of different predetermined formats;

extraction means for extracting ruled lines included in an original image having the predetermined format;

identification means for identifying a type of original image having the predetermined format on the basis of features of the ruled lines extracted by the extraction means;

discrimination means for checking an extraction result of the extraction means on the basis of the format information of an original image having the predetermined format corresponding to the type identified by the identification means; and information means for giving information on the basis of a discrimination result of the discrimination means.

The apparatus preferably further comprises division means for, when the discrimination result of the discrimination means indicates that the extraction result of the extraction means includes no error, dividing the original image having the predetermined format into a plurality of regions.

The apparatus preferably further comprises correction means for, when the discrimination result of the discrimination means indicates that the extraction result of the extraction means includes an error, correcting the error of the extraction result. When the apparatus comprises the correction means, extraction result errors can be corrected.

The apparatus preferably further comprises instruction means for instructing whether or not correction by the correction means is to be performed.

The division means preferably divides the original image having the predetermined format into the plurality of regions on the basis of the extraction result corrected by the correction means.

The information means preferably displays the discrimination result of the discrimination means.

The information means preferably gives information concerning the discrimination result of the discrimination means using a sound.

The apparatus preferably further comprises display means for, when the discrimination result of the discrimination means indicates that the extraction result of the extraction means includes an error, displaying the region that may have caused the error of the extraction result to be distinguished from the regions free from the error of the extraction result. When the region which may have caused the division result errors is displayed to be distinguished from those free from any errors, the user can easily recognize ruled lines that may cause errors in the detection result.

The apparatus preferably further comprises discrimination means for checking a division result of the division means on the basis of the format information.

The apparatus preferably further comprises correction means for, when a discrimination result of the discrimination means indicates that the division result of the division means includes an error, correcting the error of the division result. When the apparatus comprises the correction means, the division result errors can be corrected.

The apparatus preferably further comprises display means for displaying a discrimination result of the division result of the division means by the discrimination means. When the apparatus comprises the display means, the user can be informed whether or not the division results include errors.

The apparatus preferably further comprises information means for, when a discrimination result of the discrimination means indicates that the division result of the division means includes an error, giving message information indicating the error. When the apparatus comprises the informing means, the user can be informed that the division results include errors.

In order to achieve the above object, an image processing method according to the present invention comprises the following arrangement.

That is, an image processing method for extracting ruled lines included in an original image having a predetermined format, comprises:

the storage step of storing format information associated with the predetermined format in a storage medium;

the extraction step of extracting ruled lines included in an original image having the predetermined format;

the discrimination step of checking an extraction result in the extraction step on the basis of the format information; and the information step of giving information on the basis of a discrimination result in the discrimination step.

In order to achieve the above object, an image processing method according to the present invention comprises the following arrangement.

That is, an image processing method for extracting ruled lines included in an original image having a predetermined format, comprises:

the storage step of storing, in a storage medium, format information associated with each of original images having a plurality of different predetermined formats;

the extraction step of extracting ruled lines included in an original image having the predetermined format;

the identification step of identifying a type of original image having the predetermined format on the basis of features of the ruled lines extracted in the extraction step;

the discrimination step of checking an extraction result in the extraction step on the basis of the format information of an original image having the predetermined format corresponding to the type identified in the identification step; and the information step of giving information on the basis of a discrimination result in the discrimination step.

As is apparent from the above description, according to the present invention, an image processing apparatus and method, which can always accurately extract ruled lines by correcting processing errors generated in the ruled line extraction processing for extracting ruled lines included in an original image, and can eliminate processing errors generated in the region division processing by performing the region division processing based on the extracted ruled lines, can be provided.

The present invention has been made in consideration of the above-mentioned problems and has as its object to provide a character recognition apparatus and method, which can recognize characters present in regions surrounded by ruled lines included in original images with a plurality of different formats by identifying the layout of the regions surrounded by ruled lines included in each original image.

It is another object of the present invention to provide a character recognition apparatus and method, which can improve operation efficiency in the recognition processing of characters present in a region surrounded by ruled lines included in an original image.

It is still another object of the present invention to provide an image recognition apparatus and method, which can recognize the formats of an input original image in association with those having a plurality of different formats.

In order to achieve the above object, an image processing apparatus according to the present invention comprises the following arrangement.

That is, a character recognition apparatus for recognizing a character present in a region surrounded by ruled lines included in an original image having a predetermined format, comprises:

storage means for storing format information associated with each of original images having a plurality of different predetermined formats;

division means for dividing an original image having the predetermined format into a plurality of regions;

identification means for identifying a type of original image having the predetermined format on the basis of features of regions divided by the division means;

assignment means for assigning the format information of an original image having the predetermined format corresponding to the type identified by the identification means to the regions of the original image divided by the division means; and recognition means for recognizing characters present in the regions that are assigned the format information by the assignment means.

The apparatus preferably further comprises setting means for setting written directions of the characters present in the regions of the original image divided by the division means on the basis of the format information of the original image having the predetermined format corresponding to the identified type, and the recognition means recognizes the characters present in the regions divided by the division means on the basis of the written directions set by the setting means.

The apparatus preferably further comprises addition means for adding an order to the regions of the original image divided by the division means on the basis of the original image having the predetermined format corresponding to the identified type, and the recognition means recognizes the characters present in the regions divided by the division means on the basis of the order added by the addition means.

Each of the regions is preferably a rectangular region surrounded by the ruled lines.

The setting means preferably sets the written directions of the characters present in the regions on the basis of shapes of the regions.

The apparatus preferably further comprises extraction means for extracting the ruled lines included in the original image having the predetermined format, and the identification means identifies the type of original image having the predetermined format on the basis of an extraction result of the extraction means.

In order to achieve the above object, a character recognition method according to the present invention comprises the following arrangement.

That is, a character recognition method for recognizing a character present in a region surrounded by ruled lines included in an original image having a predetermined format, comprises:

the storage step of storing, in a storage medium, format information associated with each of original images having a plurality of different predetermined formats;

the division step of dividing an original image having the predetermined format into a plurality of regions;

the identification step of identifying a type of original image having the predetermined format on the basis of features of regions divided in the division step;

the assignment step of assigning the format information of an original image having the predetermined format corresponding to the type identified in the identification step to the regions of the original image divided in the division step; and the recognition step of recognizing characters present in the regions that are assigned the format information in the assignment step.

In order to achieve the above object, an image recognition apparatus according to the present invention comprises the following arrangement.

That is, an image recognition apparatus for recognizing a format of an input original image, comprises:

storage means for storing format information associated with each of original images having a plurality of different predetermined formats;

division means for dividing the original image into a plurality of regions;

comparison means for comparing features of the regions divided by the division means with the format information stored in the storage means; and recognition means for recognizing the format of the original image on the basis of a comparison result of the comparison means.

In order to achieve the above object, an image recognition method according to the present invention comprises the following arrangement.

That is, an image recognition method for recognizing a format of an input original image, comprises:

the storage step of storing, in a storage medium, format information associated with each of original images having a plurality of different predetermined formats;

the division step of dividing the original image into a plurality of regions;

the comparison step of comparing features of the regions divided in the division step with the format information stored in the storage medium in the storage step; and the recognition step of recognizing the format of the original image on the basis of a comparison result in the comparison step.

As is apparent from the above description, according to the present invention, a character recognition apparatus and method which can recognize characters present in regions included in original images having a plurality of different formats by identifying the layout of regions surrounded by ruled lines included in an original image, can be provided.

Also, a character recognition apparatus and method, which can improve operation efficiency in the recognition processing of characters present in a region surrounded by ruled lines included in an original image, can be provided.

Furthermore, an image processing apparatus and method, which can recognize the format of an input original image in association with original images with a plurality of different formats, can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4C are tables showing the configuration of the item identification ID of the first embodiment;

FIG. 5 is a table showing the configuration of the KEY block data structure of the first embodiment;

FIG. 11 is a view showing an example of an original image in the first embodiment;

FIG. 14 is a view showing the processing result obtained when errors have occurred in the region division processing executed for the original image in the first embodiment;

FIG. 18 is a table showing the relationship between keywords and lower two digits of item identification IDs in the second embodiment;

FIG. 19 is a table showing the recognition results of the character recognition processing executed for an original image in the second embodiment;

FIG. 20 is a table showing the relationship between the recognition results of the character recognition processing and the comparison results of the keyword comparison processing in the second embodiment;

FIG. 21 is a table showing another relationship between keywords and lower two digits of item identification IDs in the second embodiment;

FIG. 22 is a table showing still another relationship between keywords and lower two digits of item identification IDs in the second embodiment;

FIG. 23 is a view for explaining the arrangement for comparing a keyword with a combination of a plurality of recognition character candidates as the recognition results in the second embodiment;

FIG. 26 is a view showing the processing result of the ruled line extraction processing executed for an original image in the third embodiment;

FIG. 27 is a view showing the processing result obtained when errors have occurred in the ruled line extraction processing executed for the original image in the third embodiment;

FIG. 30 is a view showing the processing result obtained when errors have occurred in the block extraction processing executed for the original image in the third embodiment;

FIG. 35 is a table showing the relationship between the item identification IDs and the written directions in the fourth embodiment;

DESCRIPTION OF THE PREFERRED EMBODIMENTS

The preferred embodiments of the present invention will be described in detail hereinafter with reference to the accompanying drawings.

First Embodiment

Figure 1:
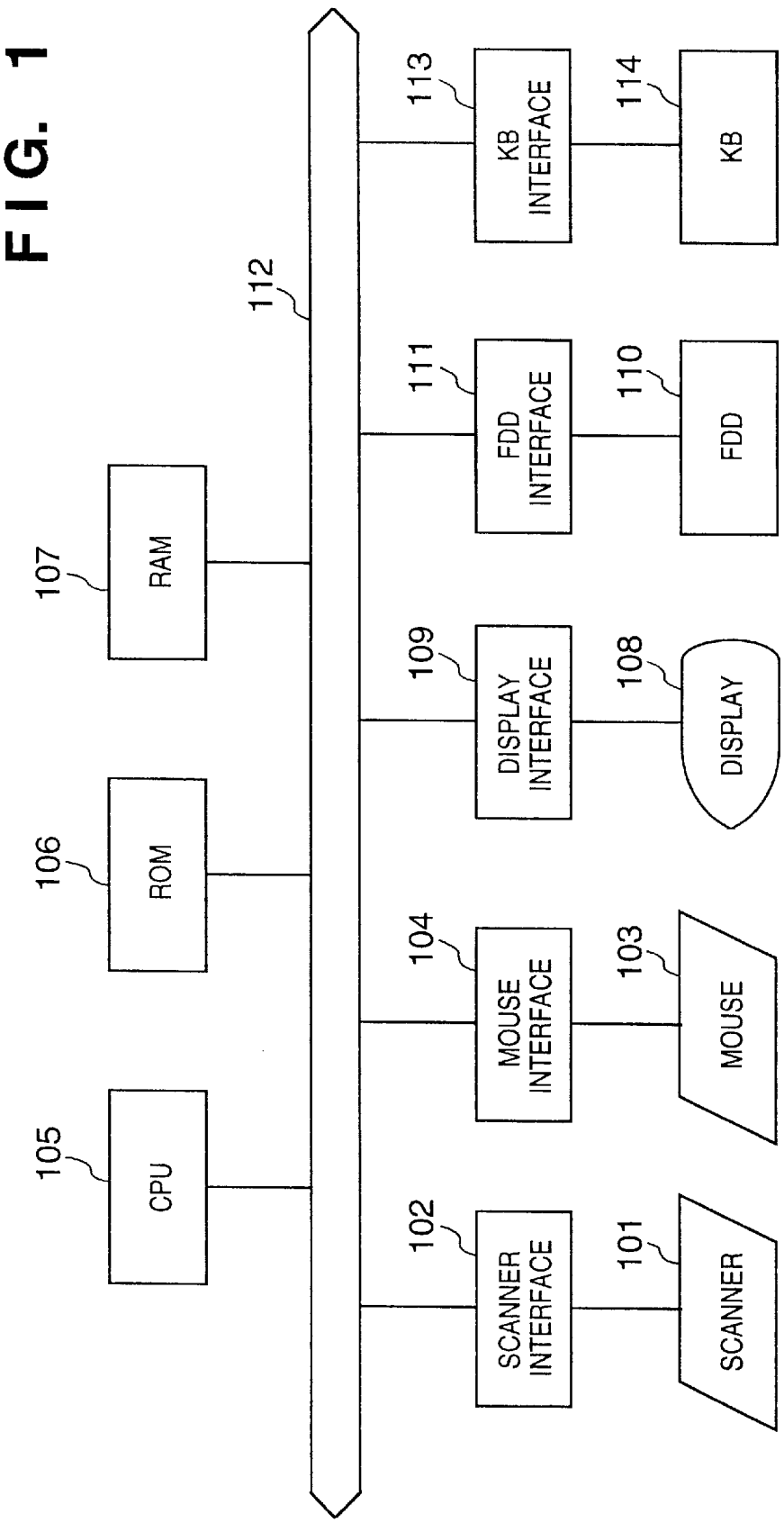
FIG. 1 is a block diagram showing the functional arrangement of an image processing apparatus according to the first embodiment.

FIG. 1 is a block diagram showing the functional arrangement of an image processing apparatus according to the first embodiment.

Referring to FIG. 1, reference numeral 101 denotes a scanner, which irradiates light onto an original image, reads light reflected by the original image, and converts the read light into an electrical signal. The original image read by the scanner 101 is stored as image data in a VRAM area of a RAM 107. Reference numeral 102 denotes a scanner interface, which converts the electrical signal obtained by the scanner 101 into a binary digital signal, and transfers the digital signal to other apparatus constituting elements. Reference numeral 103 denotes a mouse which serves as a pointing device. The user moves a cursor (not shown) displayed on a display 108 by moving the mouse 103. When the user moves a cursor 100 to the position of a desired menu item displayed on the screen, and performs drag and click operations using a button attached to the mouse, he or she can execute the contents of the menu item. Reference numeral 104 denotes a mouse interface, which receives a signal from the mouse 103 and transfers it to other apparatus constituting elements. Reference numeral 114 denotes a KB (keyboard), with which the user inputs data and executes commands. Reference numeral 113 denotes a KB interface, which receives a signal from the KB 114 and transfers it to other apparatus constituting elements.

Reference numeral 105 denotes a CPU, which controls the overall apparatus, and executes processing such as region division processing (to be described later) to be described in the present invention and recognition processing. Reference numeral 106 denotes a ROM which stores a control program to be executed by the CPU 105, various processing programs, and various data such as font data and the like. Reference numeral 107 denotes a RAM, which is used as the work area for development of an original image, the region division processing, and the like. The RAM 107 has a VRAM area serving as a predetermined storage area for storing image data (binary image data) read by the scanner 101. Reference numeral 108 denotes a display which displays image data stored in the VRAM area of the RAM 107, the region division result executed in the first embodiment, and the like. Reference numeral 109 denotes a display interface.

Reference numeral 110 denotes an FDD (floppy disk drive), which can load an FD and can read/write data from/to the FD. On the other hand, the program of the processing flow (to be described later) may be written in the loaded FD (not shown) and may be loaded onto the RAM 107 of the apparatus of this embodiment to execute the processing. Reference numeral 111 denotes an FDD interface. Reference numeral 112 denotes a bus for connecting the respective apparatus constituting elements.

The processing to be executed in the first embodiment will be described below with reference to the flow chart of FIG. 2.

Figure 2:
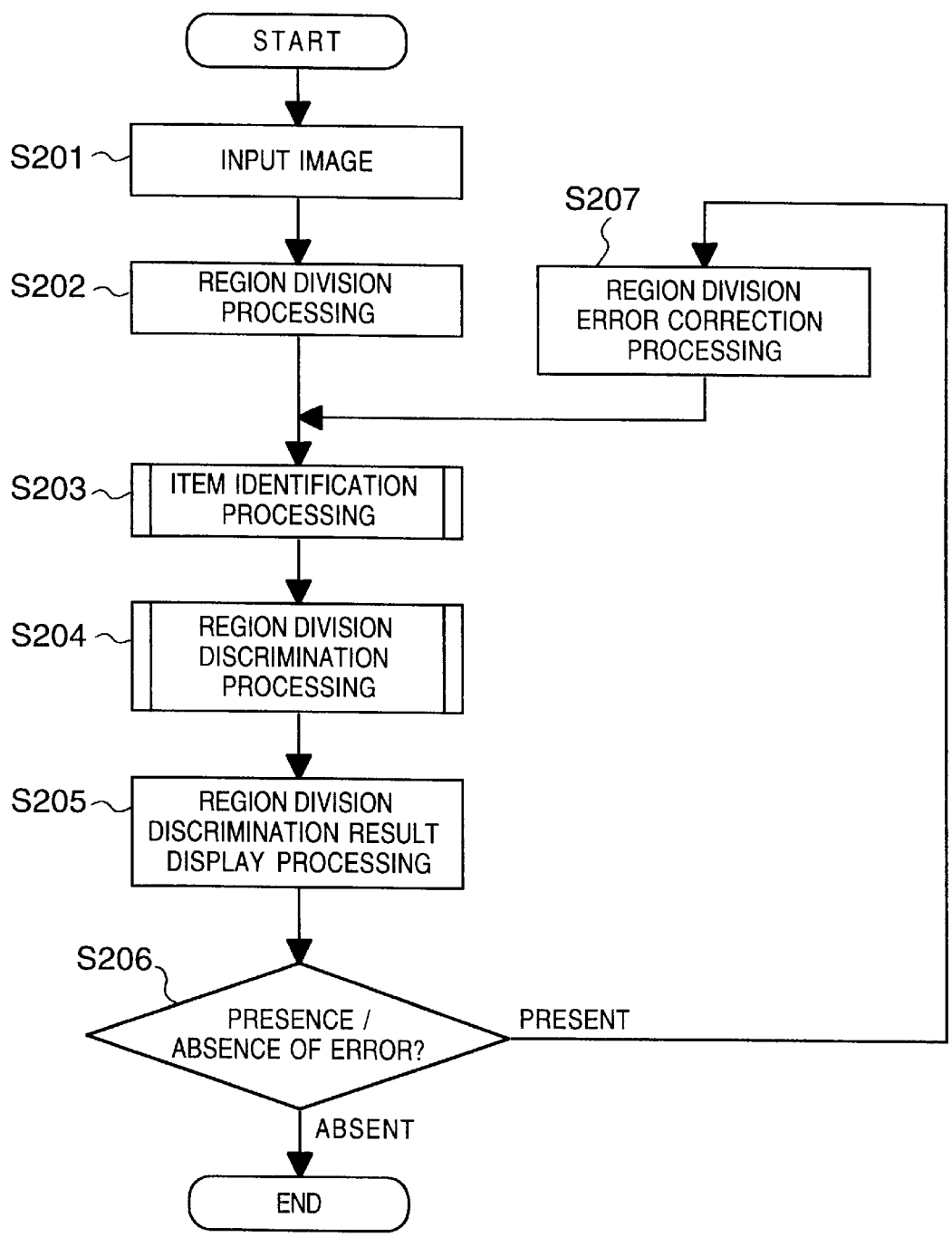
FIG. 2 is a flow chart showing the processing flow of the processing to be executed in the first embodiment.

FIG. 2 is a flow chart showing the processing flow executed in the first embodiment.

In the following description, the processing executed in the first embodiment is applied to, e.g., a family register document or the like, as shown in FIG. 11, which has predetermined regions (which will be referred to as items hereinafter) surrounded by ruled lines that constitute an original image. However, the present invention is not limited to such specific document. For example, the present invention may be applied to any other original images as long as they have predetermined formats. Moreover, it can be applied to a record office in United States of America of vital statistics managing birth certificate, marriage certificate or the like.

In step S201, an original image is read by the scanner 101 and is converted into binary image data. In step S202, the region division processing for dividing the obtained binary image data into regions in units of attributes (photographs, figures, characters, and the like) included in the binary image data is executed. In the first embodiment, when, especially, an item is extracted in the region division processing, information such as the coordinate data and the like of the item is stored as block data, as shown in FIG. 3.

The block data shown in FIG. 3 will be explained below.

Figure 3:
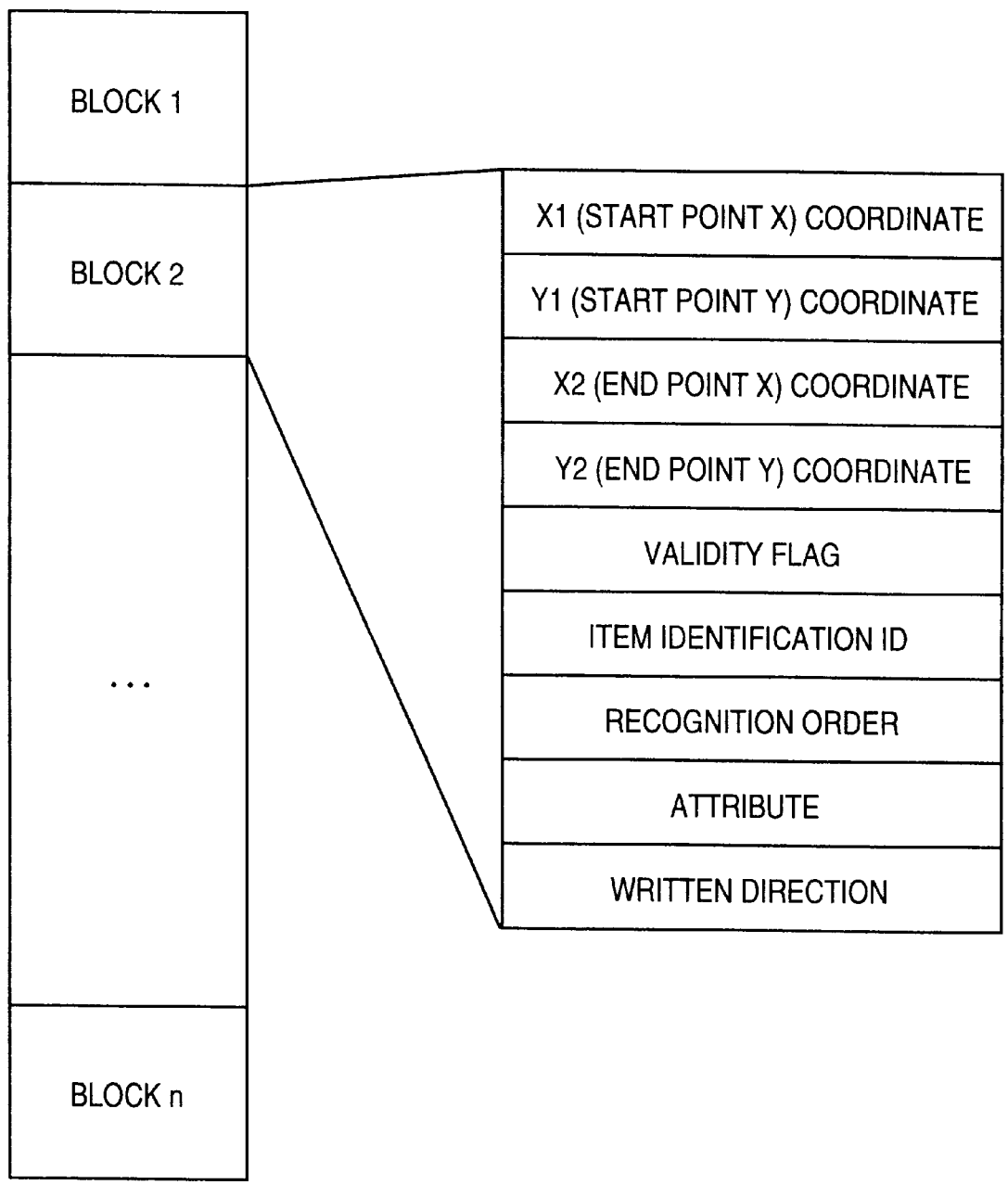
FIG. 3 is a view showing the architecture of block data in the first embodiment.

FIG. 3 is a view showing the configuration of the block data in the first embodiment.

The block data shown in FIG. 3 stores information of the start point coordinates (X1, Y1) and the end point coordinates (X2, Y2) indicating the position of each item included in binary image data developed on the RAM 107, and the validity flag, the item identification ID, the recognition order, the attribute, and the written direction of this item. The start point coordinates indicate the position coordinates of the upper right corner of each item shown in FIG. 11, and the end point coordinates indicate the position coordinates of the lower left corner of each item. The validity flag indicates whether or not the extracted item is valid. The item identification ID stores that of each item by the setting method to be described later. The recognition order stores that used when characters filled in the respective items are to be recognized. The attribute stores that serving as the division unit in the region division processing. In the case of the present invention, the attribute indicating an item (a region surrounded by ruled lines) is stored. The written direction stores information indicating the direction (vertical or horizontal writing) of characters filled in each item.

In step S203, the item identification processing for specifying the layout of the items of the original image on the basis of format information indicating the layout of the items of the original image and identifying the items constituting the original image is executed.

When the layout of the items of the original image is to be identified, the type of layout of the items of the original image is specified on the basis of the positions, shapes, areas, number, and the like of blocks obtained by dividing the original image into regions, and the respective items are identified. Note that the format information is stored in advance in the ROM 106.

In order to specify and identify the items of the family register document used as the original image of the first embodiment, IDs (item identification IDs) for specifying and identifying the respective items are defined, as shown in FIGS. 4A to 4C. By combining the IDs of the respective items, the items of the family register document are specified and identified.

The IDs (item identification IDs) shown in FIGS. 4A to 4C will be described below.

FIG. 4A shows the IDs, which define the types of layout (to be referred to as page type hereinafter) of the items of the family register document, i.e., define, as the types, "head" or "non-head" written in the upper rightmost block region surrounded by ruled lines (see FIG. 11) of the family register document. FIG. 4B shows the IDs, which define the types of person listed on the page of the family register document, i.e., define the IDs of the types shown in FIG. 4B. FIG. 4C shows the IDs which define the item names of the items that constitute the family register document, i.e., define the IDs of the types shown in FIG. 4C.

The item identification processing executed in step S203 will be described in detail below with reference to FIG. 6.

Figure 6:
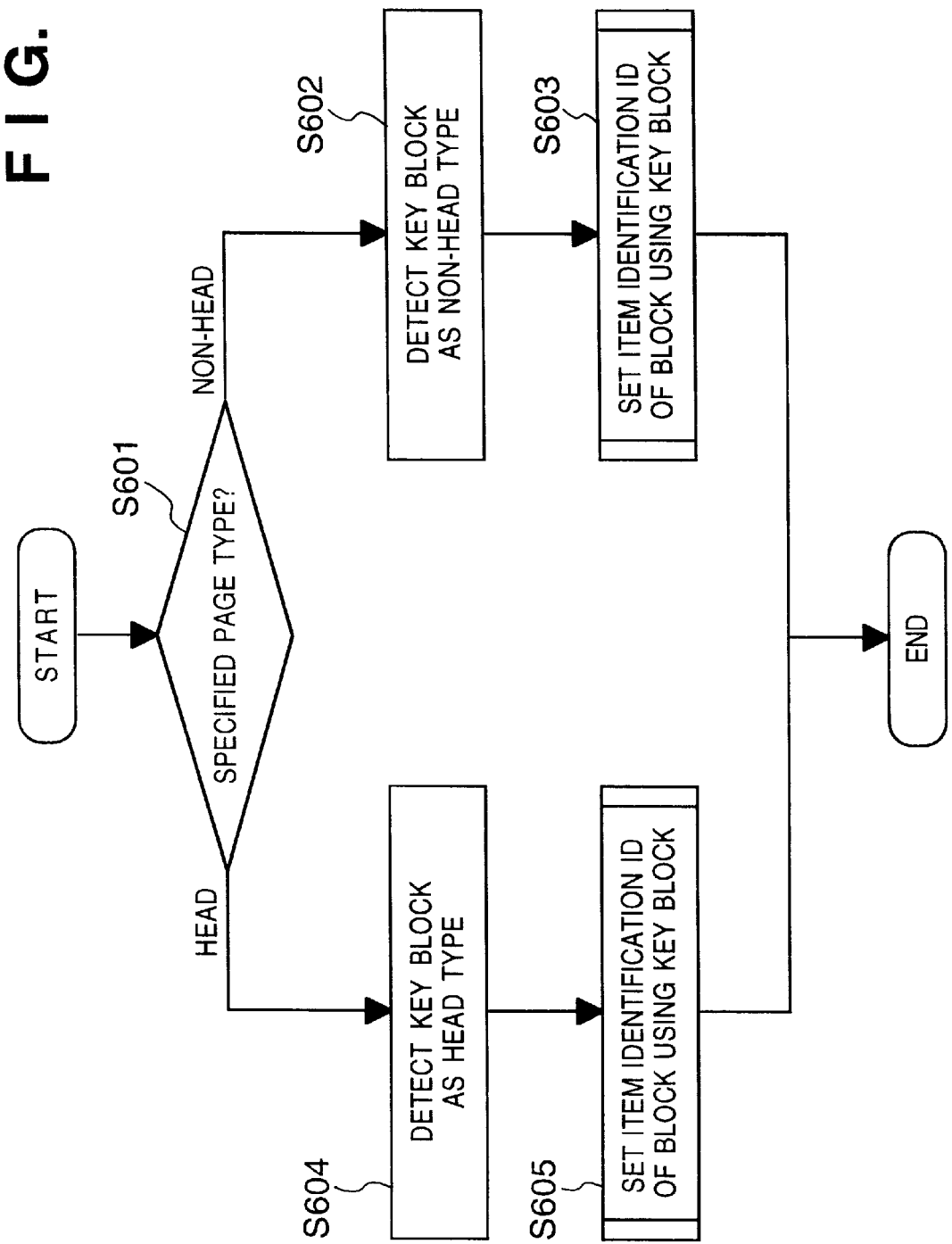
FIG. 6 is a flow chart showing in detail the processing flow of the item identification processing of the first embodiment.

FIG. 6 is a flow chart showing in detail the processing flow of the item identification processing of the first embodiment.

In step S601, the page type of family register document is specified and identified. As the identification method, the page type of family register document is identified on the basis of the shape of the upper rightmost block (item) of the family register document.

Note that the page type of family register document includes two different page types, i.e., a page type including the head of a family (to be referred to as "head type" hereinafter) and a page type not including the head of a family (to be referred to as "non-head type" hereinafter).

As the identification method, for example, when the width of the upper rightmost block of the family register document is larger than its height, the page type of family register document is identified to be "head type"; otherwise, the page type is identified to be "non-head type". Alternatively, when the width of the upper rightmost block is larger than that of a block having the same Y1 coordinate as that of the block, the page type of family register document may be identified to be "head type"; when the width of the upper rightmost block is equal to that of a block having the same Y1 coordinate as that of the block, the page type may be identified to be "non-head type".

The description will revert to that of the flow chart.

If it is determined in step S601 that the width of the upper rightmost block of the family register document is larger than its height, the page type of family register document is identified to be "head type", and the flow advances to step S604. On the other hand, if the width of the upper rightmost block of the family register document is smaller than its height, the page type of family register document is identified to be "non-head type", and the flow advances to step S602.

After the page type of family register document is identified, blocks that serve as keys for identifying the family register document and items in more detail (to be referred to as a KEY block) are detected on the basis of the relative positional relationship of the respective items on the family register document.

When the page type is "head type", a block with a title "本籍" (birth place), a block in the first line of a column listing the compiled date (year, month, day), a block in the first line of a column listing date of issuing marriage certificate data and like, and a block with a title "父" (father) are respectively detected as KEY0 to KEY3 blocks in step S604, and the addresses of the respective block data are stored in a KEY block structure, as shown in FIG. 5.

The KEY block data structure shown in FIG. 5 will be explained below.

FIG. 5 is a table showing the configuration of the KEY block data structure of the first embodiment.

Referring to FIG. 5, the KEY block data structure stores information of the items serving as keys for identifying the items that constitute the family register document, and includes six KEY0 to KEY5 blocks, as shown in FIG. 5. The KEY blocks to be detected are detected in correspondence with the page type, and block data of the detected KEY blocks are stored.

In step S605, items are extracted in more detail in units of items having information common to the KEY0 to KEY3 blocks using the detected KEY0 to KEY3 blocks, and item identification IDs are assigned to the extracted items. This setting processing will be described in detail later with reference to the flow chart of FIG. 7.

On the other hand, if the page type is "non-head type", a block in the first line of a column listing date of issuing marriage certificate data of the first person, a block with a title "本籍" (father) of the first person, a block in the first line of a column listing date of issuing marriage certificate data or the like of the second person, and a block with a title "父" (father) of the second person are detected as KEY2 to KEY5 blocks, and block data of the detected KEY2 to KEY5 blocks are stored in the KEY block data structure in step S602.

In step S603, items are extracted in more detail in units of items having information common to the KEY0 to KEY3 blocks using the detected KEY2 to KEY5 blocks, and item identification IDs are assigned to the extracted items. This setting processing will be described in detail later with reference to the flow chart of FIG. 8.

The processing for setting the item identification IDs when the page type is "head type" will be described below with reference to the flow chart in FIG. 7.

Figure 7:
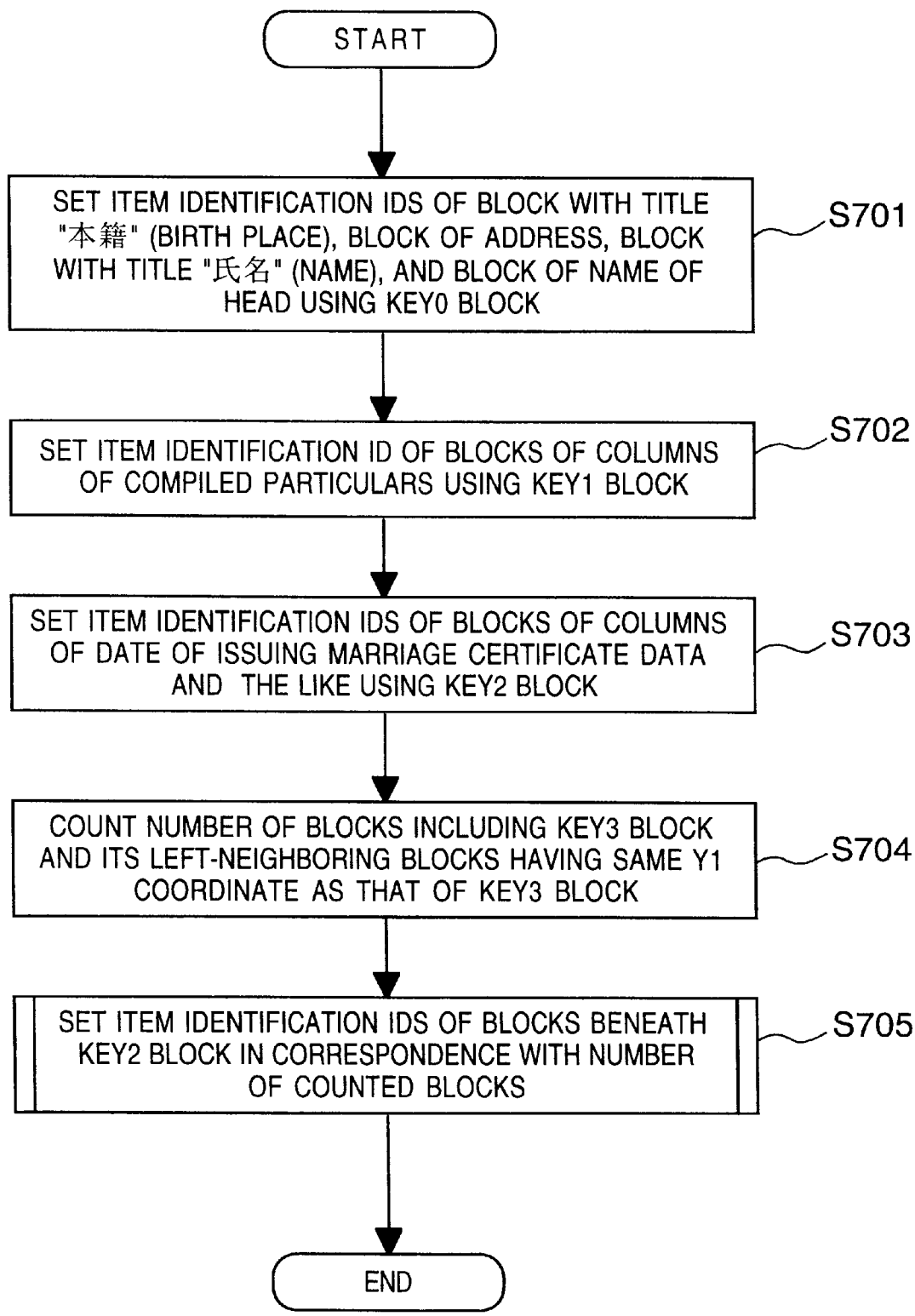
FIG. 7 is a flow chart showing the processing flow of the processing for setting an item identification ID when the page type is "head type" in the first embodiment.

FIG. 7 is a flow chart showing the processing flow of the processing for setting the item identification IDs when the page type is "head type" in the first embodiment.

In step S701, item identification IDs are respectively assigned to three blocks located beneath the KEY0 block (the block with a title "本籍" (birth place) in FIG. 11) having the same width as that of the KEY0 block. In step S702, item identification IDs are assigned to the KEY1 block (the block in the first line of the column listing compiled particulars in FIG. 11) and three neighboring blocks on its left side, and four blocks beneath them since they are deemed to belong to an identical item group (the column of compiled particulars).

In step S703, item identification IDs are assigned to the KEY2 block (the block in the first line of the column listing date of issuing marriage certificate data and the like in FIG. 11) and nine neighboring blocks on its left side since they are deemed to belong to an identical item group (the column of date of issuing marriage certificate data and the like).

In step S704, the KEY3 block (the block with the title "父" (father) in FIG. 11) and neighboring blocks on its left side having the same Y1 coordinate as that of the KEY3 block are located beneath the item group including the KEY2 block, and the number of these blocks is counted. In step S705, item identification IDs are assigned to the blocks located beneath the item group including the KEY2 block based on the count value. This setting processing will be described in detail later with reference to the flow chart in FIG. 9.

The processing for setting item identification IDs when the page type is "non-head type" will be described below with reference to the flow chart in FIG. 8.

Figure 8:
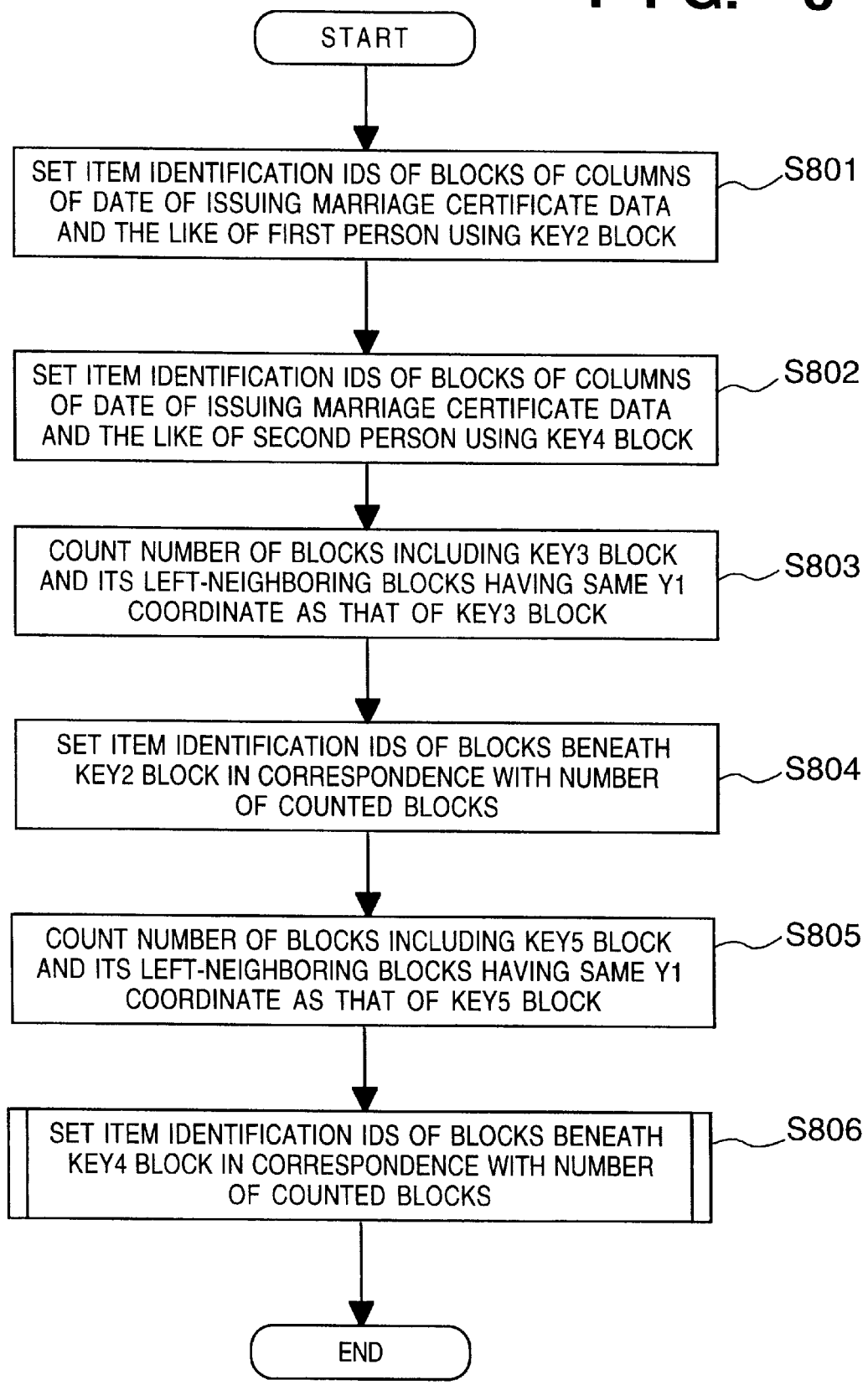
FIG. 8 is a flow chart showing the processing flow of the processing for setting an item identification ID when the page type is "non-head type" in the first embodiment.

FIG. 8 is a flow chart showing the processing flow of the processing for setting item identification IDs when the page type is "non-head type" in the first embodiment.

In step S801, item identification IDs are assigned to the KEY2 block (the block in the first line of the column listing date of issuing marriage certificate data and the like) and eight neighboring blocks on its left side since they are deemed to belong to an identical item group (the column of date of issuing marriage certificate data and the like).

In step S802, item identification IDs are assigned to the KEY4 block (the block in the first line of the column listing date of issuing marriage certificate data and the like of the second person) and eight neighboring blocks on its left side since they are deemed to belong to an identical item group (the column of date of issuing marriage certificate data and the like of the second person).

In step S803, the KEY3 block (the block with the title "父" (father)) and neighboring blocks on its left side having the same Y1 coordinate as that of the KEY3 block are located beneath the item group including the KEY2 block, and the number of these blocks is counted. In step S804, item identification IDs are assigned to the blocks located beneath the item group including the KEY2 block on the basis of the number of counted blocks.

In step S805, the KEY5 block (the block with the title "父" (father) of the second person) and neighboring blocks on its left side having the same Y1 coordinate as that of the KEY5 block are located beneath the item group including the KEY4 block, and the number of these blocks is counted. In step S806, item identification IDs are assigned to these blocks beneath the item group including the KEY4 block on the basis of the number of counted blocks.

The processing for setting the item identification IDs of blocks located beneath the column of date of issuing marriage certificate data and the like will be described in detail below with reference to the flow chart in FIG. 9.

Figure 9:
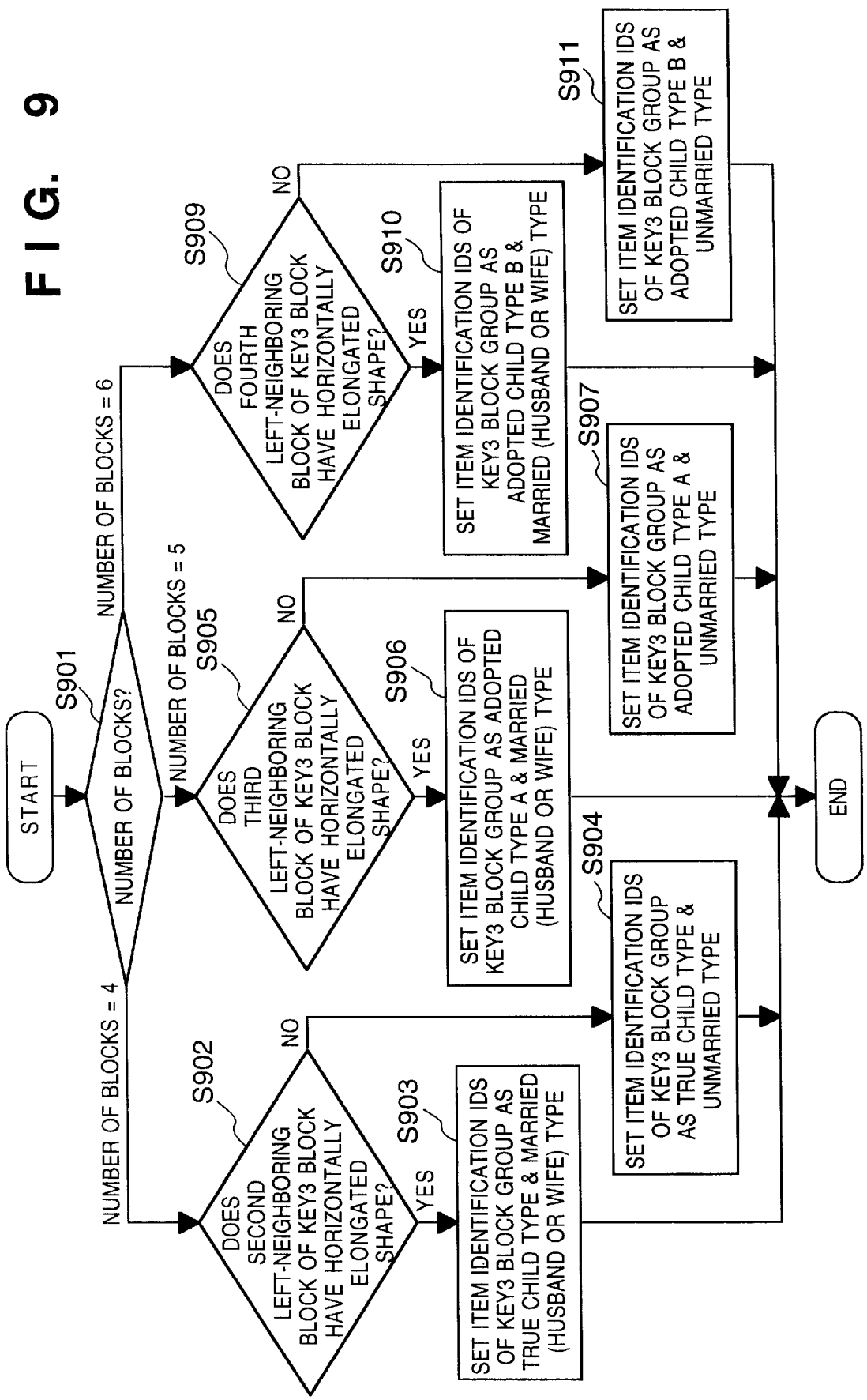
FIG. 9 is a flow chart showing the processing flow of the processing for setting an item identification ID in a block below the column of, e.g., date of issuing marriage certificate data or the like in the first embodiment.

FIG. 9 is a flow chart showing the processing flow of the processing for setting the item identification IDs of blocks located beneath the column of date of issuing marriage certificate data and the like in the first embodiment.

Note that the flow chart in FIG. 9 shows the processing to be executed in step S704 in the flow chart in FIG. 7, and steps S804 and S805 in the flow chart in FIG. 8, and the processing in step S704 in the flow chart in FIG. 7, i.e., the case of the family register document having the page type ="head type", will be exemplified below. Since the processing in steps S804 and S805 in the flow chart in FIG. 8, i.e., the case of the family register document having the page type="non-head type", can be realized by the same processing as that to be described below, a detailed description thereof will be omitted.

In step S901, the number of counted blocks is checked. If the number of blocks is 4, a type listing only the true parents (to be referred to as "true child type" hereinafter) is determined, and the flow advances to step S902. On the other hand, if the number of blocks is 5, a type additionally listing only the adoptive father or mother (to be referred to as "adopted child type A" hereinafter) is determined, and the flow advances to step S905. Furthermore, if the number of blocks is 6, a type additionally listing both the adoptive father and mother (to be referred to as "adopted child type B" hereinafter) is determined, and the flow advances to step S909.

If the number of counted blocks is 4, i.e., "true child type" is determined, it is checked in step S902 if the second left-neighboring block of the KEY3 block has a horizontally elongated shape. If this block has a horizontally elongated shape (YES in step S902), "married (husband or wife) type" is determined, and the flow advances to step S903. On the other hand, if the block does not have a horizontally elongated shape (NO in step S902), "unmarried type" is determined, and the flow advances to step S904.

In step S903, item identification IDs are set based on the relative positional relationship with the KEY3 block since "true child type" and "married (husband or wife) type" are determined. In step S904, item identification IDs are set based on the relative positional relationship with the KEY3 block since "true child type" and "unmarried type" are determined.

If the number of counted blocks is 5, i.e., if "adopted child type A" is determined, it is checked in step S905 if the third left-neighboring block of the KEY3 block has a horizontally elongated shape. If the block has a horizontally elongated shape (YES in step S905), "married (husband or wife) type" is determined, and the flow advances to step S906. On the other hand, if the block does not have a horizontally elongated shape (NO in step S905), "unmarried type" is determined, and the flow advances to step S907.

In step S906, item identification IDs are set based on the relative positional relationship with the KEY3 block since "adopted child type A" and "married (husband or wife) type" are determined. In step S907, item identification IDs are set based on the relative positional relationship with the KEY3 block since "adopted child type A" and "unmarried type" are determined.

If the number of counted blocks is 6, i.e., if "adopted child type B" is determined, it is checked in step S909 if the fourth left-neighboring block of the KEY3 block has a horizontally elongated shape. If the block has a horizontally elongated shape (YES in step S909), "married (husband or wife) type" is determined, and the flow advances to step S910. On the other hand, if the block does not have a horizontally elongated shape (NO in step S909), "unmarried type" is determined, and the flow advances to step S911.

In step S910, item identification IDs are set based on the relative positional relationship with the KEY3 block since "adopted child type B" and "married (husband or wife) type" are determined. In step S911, item identification IDs are set based on the relative positional relationship with the KEY3 block since "adopted child type B" and "unmarried type" are determined.

The description will return to that of the flow chart in FIG. 2.

In step S204, the region division discrimination processing for discriminating the presence/absence of errors of the processing results of the region division processing in step S202 described above is executed on the basis of the items obtained by the item identification processing in step S203 described above. The region division discrimination processing will be described in detail below with reference to the flow chart in FIG. 10.

Figure 10:
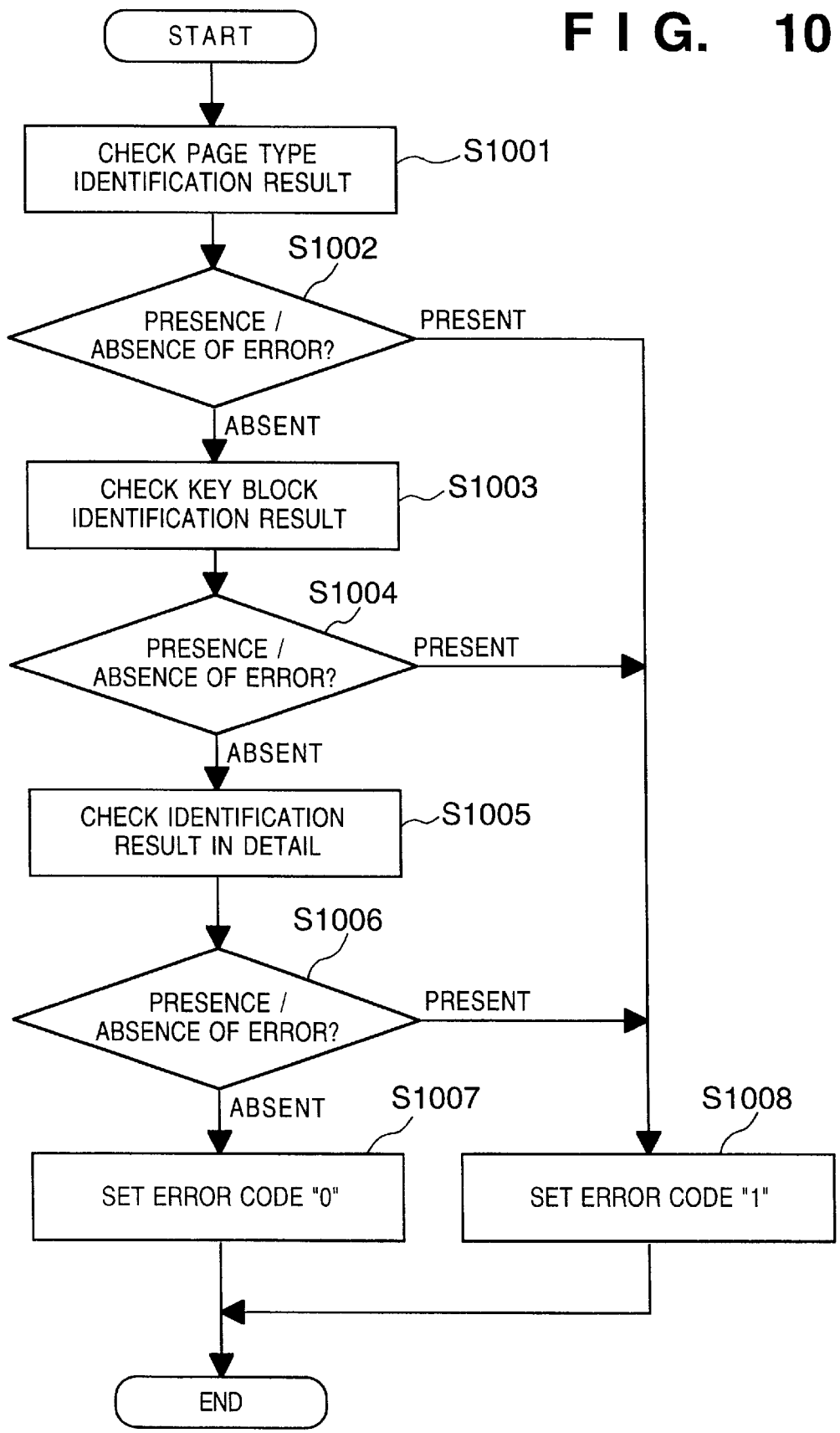
FIG. 10 is a flow chart showing in detail the region division discrimination processing of the first embodiment.

FIG. 10 is a flow chart showing in detail the processing flow of the region division discrimination processing in the first embodiment.

In step S1001, the identification result of the page type is checked. In step S1002, it is checked if the identification result includes errors. If the identification result includes errors, the flow advances to step S1008; otherwise, the flow advances to step S1003.

Whether or not the identification result includes errors is checked as follows. For example, when "non-head type" is identified although the width of the upper rightmost block of the family register document is larger than that of other blocks having the same Y1 coordinate as that of the upper rightmost block, or when "head type" is identified although the width of the upper rightmost block is equal to that of other blocks having the same Y1 coordinate as that of the upper rightmost block, it is determined that region division processing errors have occurred due to erroneous recognition of blurred ruled lines or some characters of the text, or the like. In step S1008, an error code "1" is set, and the region division discrimination processing is forced to end.

In step S1003, the identification results of the KEY blocks are checked. It is checked in step S1004 if the identification results include errors. If the identification results include errors, the flow advances to step S1008; otherwise, the flow advances to step S1005.

Whether or not the identification results include errors is checked as follows. For example, when one or some of the KEY0, KEY1, KEY2, and KEY3 blocks are not detected although the page type of family register document is "head type", or when one or some of the KEY2, KEY3, KEY4, and KEY5 blocks are not detected although the page type is "non-head type", it is determined that region division errors have occurred. In step S1008, an error code "1" is set, and the region division discrimination processing is forced to end.

In step S1005, the detailed identification results of the items are checked in units of page types. It is checked in step S1006 if the identification results include errors. If the identification results include errors, the flow advances to step S1008; otherwise, the flow advances to step S1007.

Whether or not the identification results include errors is checked as follows. For example, when the number of blocks located beneath the KEY0 block and having the same width is not 3 although the page type is "head type", it is determined that region division errors have occurred. In step S1008, an error code "1" is set, and the region division discrimination processing is forced to end.

On the other hand, when the KEY1 block and its three left-neighboring blocks do not have the same width, it is determined that region division errors have occurred. In step S1008, an error code "1" is set, and the region division discrimination processing is forced to end.

Also, when the KEY2 block and its nine left-neighboring blocks do not have the same width, it is determined that region division errors have occurred. In step S1008, an error code "1" is set, and the region division discrimination processing is forced to end.

Furthermore, when the total number of the KEY3 block and its neighboring blocks having the same Y1 coordinate as that of the KEY3 block is 3 or less or 7 or more, it is determined that region division errors have occurred. In step S1008, an error code "1" is set, and the region division discrimination processing is forced to end.

Likewise, the identification results in the case of the page type="non-head type" are checked in detail.

If it is determined by checking the identification results that the item identification processing has normally ended, it is determined that no region division processing errors have occurred. Then, an error code "0" is set in step S1007, and the region division discrimination processing ends.

The description will return to that of the flow chart in FIG. 2.

In step S205, the region division discrimination result display processing for displaying the processing result of the region division discrimination processing on the display 108 is executed. In step S206, it is checked based on the processing result of the region division discrimination processing if region division processing errors have occurred. If no region division processing errors are found, i.e., an error code "0" is set, it is determined that no errors have occurred. A message indicating that the processing has normally ended is displayed on the display 108, and all the processing operations end. On the other hand, if region division processing errors are found, i.e., an error code "1" is set, a message indicating that region division processing errors have occurred is displayed on the display 108, thus prompting the user to correct the region division processing errors.

After the error message of the region division processing is displayed by the region division discrimination result display processing, the current region division state of the blocks is displayed on the original image in step S207. The operator then performs region division error correction processing for correcting the processing result of the region division processing by means of image processing, e.g., by enlarging, reducing, moving, or deleting the object to be corrected, or creating a new block.

The corrected result is reflected when the operator presses, e.g., a correction end button using the mouse 103, and the block data corresponding to the corrected item is updated. Thereafter, the item identification processing is executed again. If the corrected result is correct, an error code "0" is set as the processing result of the region division discrimination processing, and all the processing operations end.

The processing processes executed in the flow chart in FIG. 2 above will be explained in detail below with reference to FIGS. 11 to 15.

A case will be exemplified below wherein no errors have occurred in extracting the regions in units of attributes by the region division processing of the original image.

Figure 12:
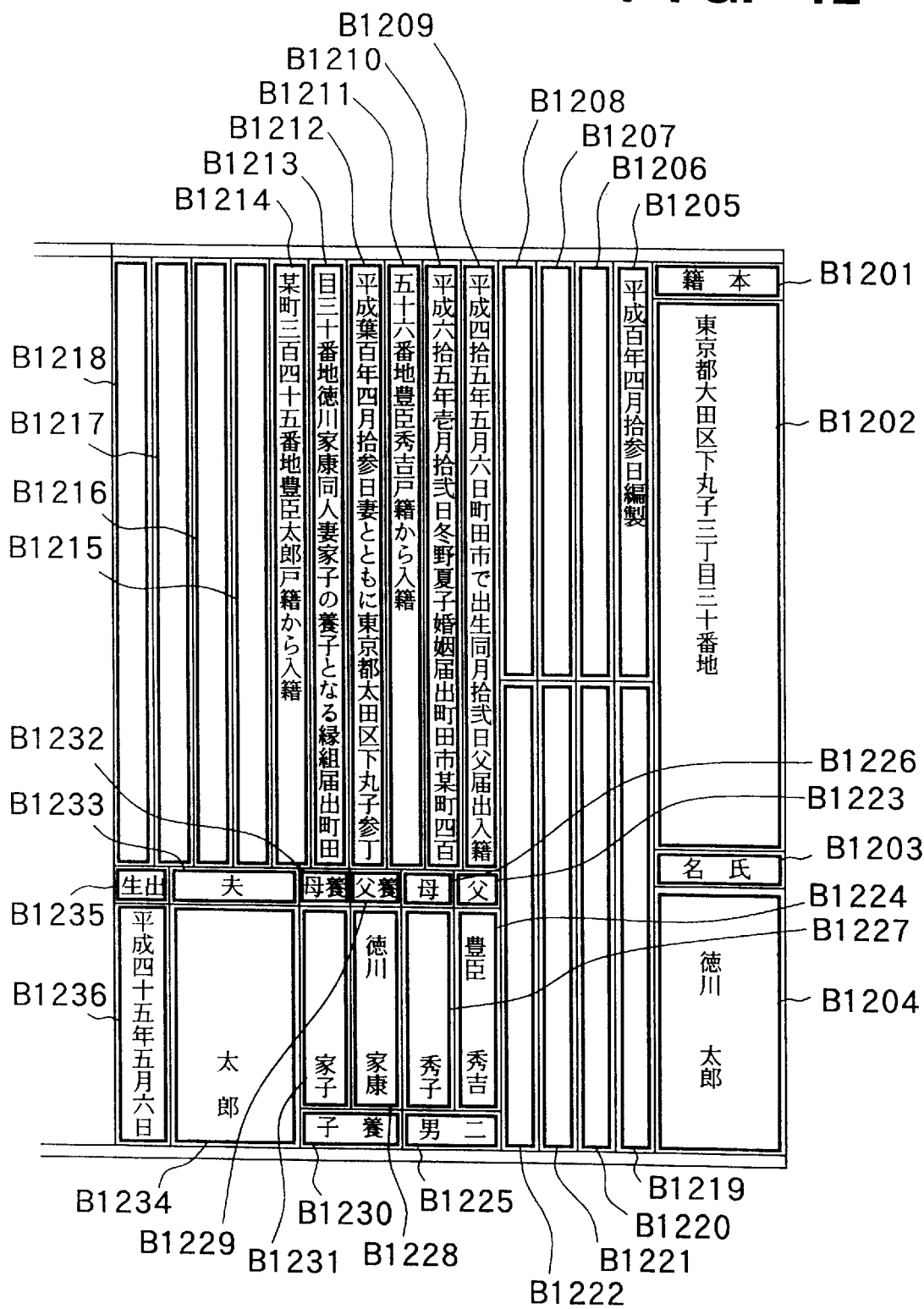
FIG. 12 is a view showing the processing result of the region division processing executed for the original image in the first embodiment.

For example, assume that blocks B1201 to B1236 of a plurality of blocks shown in FIG. 12 are obtained as a result of the region division processing described in step S202 in FIG. 2 for the original image of the family register document shown in FIG. 11. When the item identification processing described in step S203 in FIG. 2 is performed for the region division result shown in FIG. 12, "head type" is determined since the width of the upper rightmost block B1201 is larger than its height and is different from those of other blocks having the same Y1 coordinate as that of the block B1201 in this case.

Since the page type="head type" is determined, the upper rightmost block B1201 is defined as a "block (KEY0) with the title "本籍" (birth place)", and its address is recorded as the KEY block data.

Subsequently, the block B1205 which neighbors on the left side of the KEY0 block and has the same Y1 coordinate as that of the KEY0 block is defined as a "block (KEY1) in the first line of the column listing compiled particulars", and its address is recorded as the KEY block data.

The block B1209, which has the same Y1 coordinate as that of the KEY0 block, has a height larger than that of the KEY1 block, and has the rightmost X2 coordinate, is defined as a "block (KEY2) in the first line of the column listing date of issuing marriage certificate data and the like", and its address is recorded as the KEY block data. Furthermore, the block B1223 beneath the block B1209 is defined as a "block (KEY3) with the title "父" (father)", and its address is recorded as the KEY block data.

Thereafter, the blocks are extracted in more detail in units of items having information common to the detected KEY blocks. Item identification IDs are assigned to the extracted blocks.

Since the page type is "head type", the three blocks B1202 to B1204 having the same width are present beneath the KEY0 block. For this reason, item identification IDs are assigned to these blocks including the KEY0 block. For example, as shown in FIGS. 4A to 4C, the item identification ID to be assigned to the block B1201 is 1000 (the page type is "head type")+000 (the person listed on the page of the head)+10 (title "本籍" (birth place))=1010. Similarly, item identification IDs "1011" to "1013" are assigned to the blocks B1202 to B1204.

Subsequently, since the four neighboring blocks B1205 to B1208 including the KEY1 block, and the blocks B1219 to B1222 beneath them are those having information common to the KEY1 block, corresponding item identification IDs are assigned to these blocks. In this case, item identification IDs "1020" to "1027" are set.

Also, since the 10 neighboring blocks B1209 to B1218 including the KEY2 block are those having information common to the KEY2 block, corresponding item identification IDs are assigned to these blocks. In this case, item identification IDs "1080" to "1089" are set.

Furthermore, item identification IDs are assigned to blocks beneath the blocks including the KEY2 block in correspondence with the number of blocks including the KEY2 block.

In the case of the family register document shown in FIG. 11, since the number of blocks is 6, a type listing both the adoptive father and mother ("adoptive father type B") is determined. Also, since the fourth neighboring block B1233 on the left slde of the KEY3 block has a horizontally elongated shape, "married (husband or wife) type" is determined.

As a consequence, since the rightmost block B1223 of those having the same Y1 coordinate as that of the KEY3 block is the KEY3 block itself, it is determined to be a "block with the title "父" (father)", and an item identification ID "1030" is assigned thereto.

The block B1226 is determined to be a "block with the title "母" (mother)", and an item identification ID "1032" is assigned thereto. The block B1229 is determined to be a "block with the title "養父" (adoptive father)", and an item identification ID "1040" is assigned thereto. The block B1232 is determined to be a "block with the title "養母" (adoptive mother)", and an item identification ID "1042" is assigned thereto. The block B1233 is determined to be a "block listing "夫" (husband) or "妻" (wife)", and an item identification ID "1050" is assigned thereto. The block B1235 is determined to be a "block with the title "出生" (birth)", and an item identification ID "1070" is assigned thereto.

Blocks underneath these blocks "父" (father), "母" (mother), "養父" (adoptive father), "養母" (adoptive mother), "夫" (husband) or "妻" (wife), and "出生" (birth) are determined to be those listing their "names" and "date of birth", and an item identification ID "1031" is assigned to the block B1224. An item identification ID "1031" is assigned to the block B1224.

An item identification ID "1033" is assigned to the block B1227. An item identification ID "1041" is assigned to the block B1228. An item identification ID "1043" is assigned to the block B1231. An item identification ID "1051" is assigned to the block B1234. An item identification ID "1071" is assigned to the block B1236.

Furthermore, the block B1225 underneath the blocks B1224 and B1227 is determined to be a block listing "family relationship", and an item identification ID "1034" is assigned thereto. Also, the block B1230 underneath the blocks B1228 and B1231 is determined to be a block listing "family relationship", and an item identification ID "1044" is assigned thereto.

Figure 13:
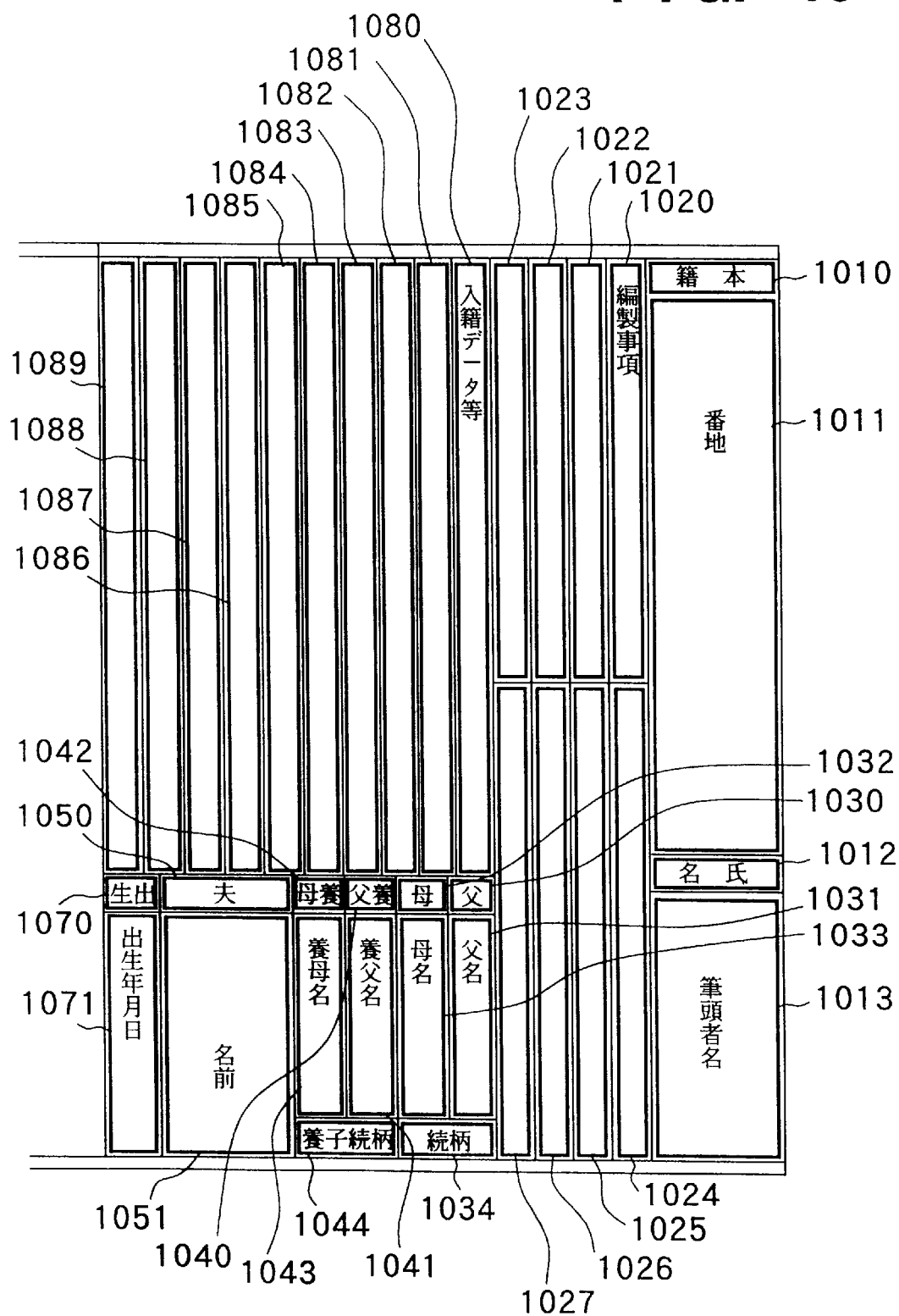
FIG. 13 is a view showing the setting result of item identification IDs assigned to the original image in the first embodiment.

In this manner, the item identification IDs shown in FIG. 13 are assigned to the respective items.

Thereafter, the region division discrimination processing is performed based on the result of the item identification processing. In this case, since the region division processing is free from any errors, a message indicating this is displayed on the display 108 by the region division discrimination result display processing, and the processing normally ends.

On the other hand, a case will be exemplified below wherein errors have occurred in extracting the regions in units of attributes by the region division processing of the original image.

For example, assume that the region division processing result shown in FIG. 14 is obtained as a result of the region division processing described in step S202 in FIG. 2 for the original image of the family register document shown in FIG. 11. When the item identification processing described in step S203 in FIG. 2 is performed for the processing result shown in FIG. 14, a ruled line 1401 is blurred, and two blocks are combined into the block B1402. Accordingly, since the height of the block B1402 is larger than its width, the page type is identified to be "non-head type". However, in the item identification processing, although "non-head type" is determined, since the block B1402 has a width different from those of other blocks having the same Y1 coordinate as that of the block B1402, this fact is contradictory to the determination of "non-head type". Consequently, it is determined that region division processing errors have occurred, an error code "1" is set, and the region division discrimination processing is forced to end.

In the region division discrimination result display processing, a message indicating that error division processing errors have occurred is displayed on the display 108, and the processing result (FIG. 14) is displayed on the original image (the family register document in FIG. 11).

Figure 15:
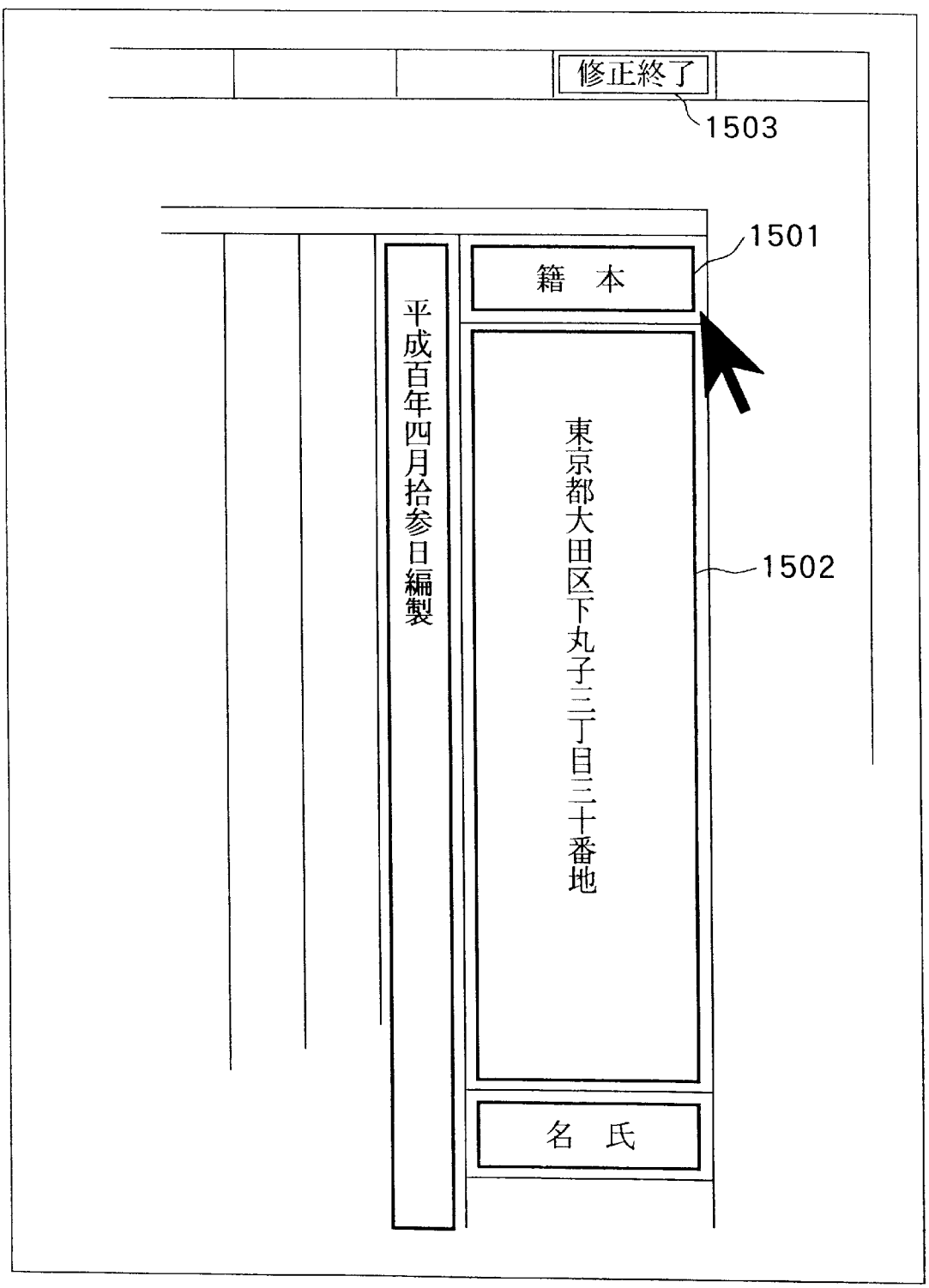
FIG. 15 is a view showing the processing for correcting the processing result obtained when errors have occurred in the region division processing executed for the original image in the first embodiment.

When the current processing result (FIG. 14) is displayed on the original image, the operator reduces the size of the wrong block B1402 (FIG. 14) to obtain a block B1502 shown in FIG. 15, and also creates a new block B1501;

When the operator presses the correction end button (1503) using the mouse 103, the contents of the blocks of the corrected items are updated to have the corresponding block data, and the item identification processing is executed again.

Thereafter, the region division discrimination processing is performed based on the result of the item identification processing. In this case, since the region division processing errors have been corrected, a message indicating this is displayed on the display 108 by the region division discrimination result display processing, and the processing normally ends.

As described above, according to the present invention, since the layout of the items included in the family register document is identified, the presence/absence of processing errors in the region division processing can be checked. Even when processing errors have occurred in the region division processing, they can be corrected.

Since the above-mentioned region division processing, item identification processing, region division discrimination processing, region division discrimination result display processing, and region division error correction processing are provided so that region division errors can be corrected, the presence/absence of errors can be easily determined, the operability can be improved, and the overall processing time can be shortened.

When it is determined in the region division discrimination processing that errors have occurred, an error code "1" is set, and a message indicating this is displayed for the operator in the region division discrimination result display processing. However, the present invention is not limited to this. For example, error codes may be set in correspondence with various types of errors to specify error types, and the error type may be visually or audibly presented in the region division discrimination result display processing.

Figure 16:
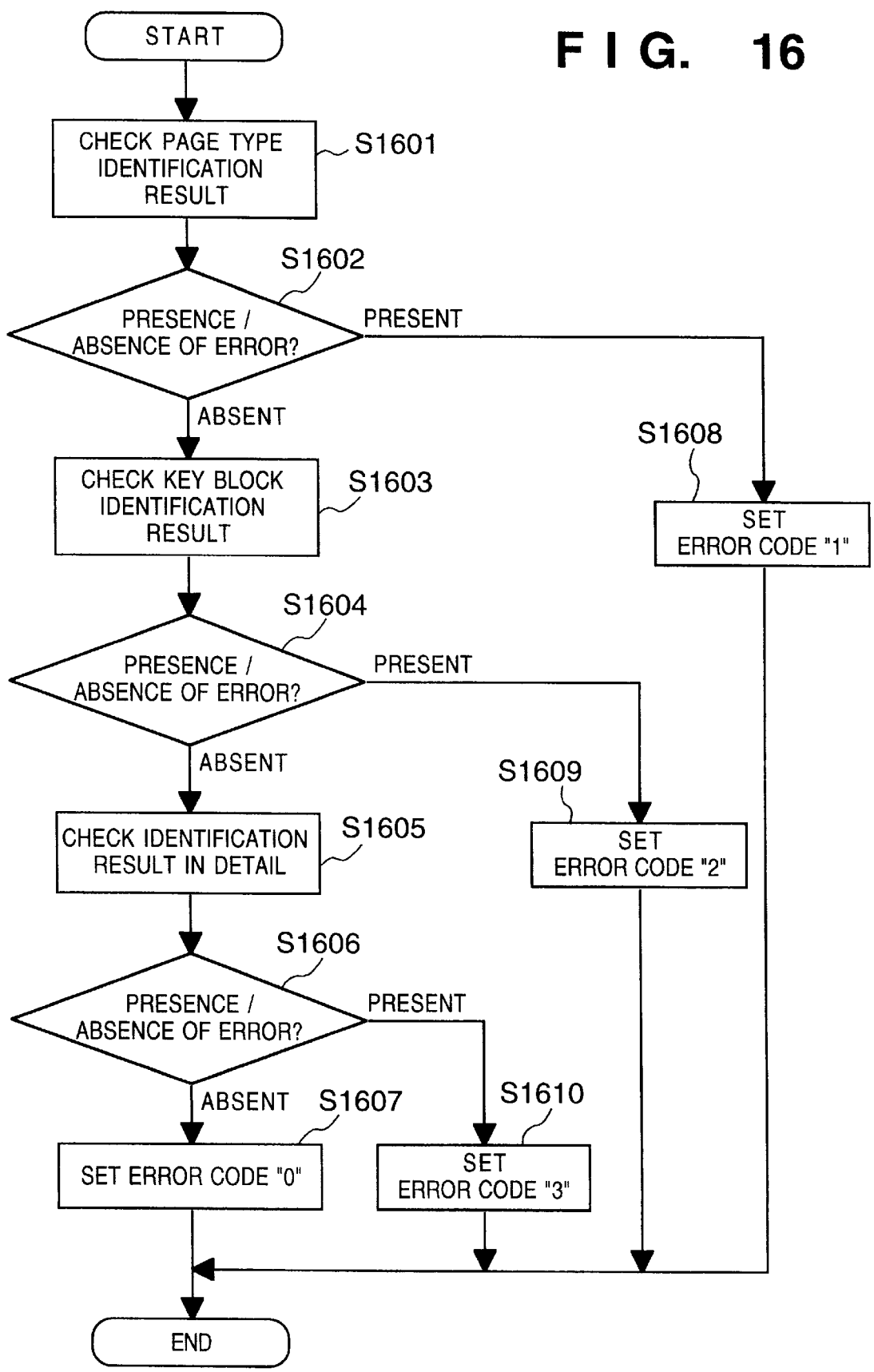
FIG. 16 is a flow chart showing in detail the processing flow of another region division discrimination processing of the first embodiment.

For example, the region division discrimination processing shown in the flow chart in FIG. 16 may be performed.

FIG. 16 is a flow chart showing in detail the processing flow of another region division discrimination processing in the first embodiment.

In step S1601, the identification result of the page type is checked. It is checked in step S1602 if the identification result includes errors. If errors have occurred, the flow advances to step S1608; otherwise, the flow advances to step S1603.

Whether or not the identification result includes errors can be checked as follows. For example, when "non-head type" is identified although the width of the upper rightmost block of the family register document is larger than that of other blocks having the same Y1 coordinate as that of the upper rightmost block, or when "head type" is identified although the width of the upper rightmost block is equal to that of other blocks having the same Y1 coordinate as that of the upper rightmost block, it is determined that region division processing errors have occurred due to erroneous recognition of blurred ruled lines or some characters of the text, or the like. In step S1608, an error code "1" is set, and the region division discrimination processing is forced to end.

In step S1603, the identification results of the KEY blocks are checked. It is checked in step S1604 if the identification results include errors. If errors have occurred, the flow advances to step S1609; otherwise, the flow advances to step S1605.

Whether or not the identification results include errors can be checked as follows. For example, when one or some of the KEY0, KEY1, KEY2, and KEY3 blocks are not detected although the page type of family register document is "head type", or when one or some of the KEY2, KEY3, KEY4, and KEY5 blocks are not detected although the page type is "non-head type", it is determined that region division errors have occurred. In step S1609, an error code "2" is set, and the region division discrimination processing is forced to end.

In step S1605, the identification results of the items are checked in detail in units of page types. It is checked in step S1606 if the identification results include errors. If errors have occurred, the flow advances to step S1610; otherwise, the flow advances to step S1607.

Whether or not the identification results include errors is checked as follows. For example, when the number of blocks located beneath the KEY0 block and having the same width is not 3 although the page type is "head type", it is determined that region division errors have occurred. In step S1610, an error code "3" is set, and the region division discrimination processing is forced to end.

On the other hand, when the KEY1 block and its three left-neighboring blocks do not have the same width, it is determined that region division errors have occurred. In step S1610, an error code "3" is set, and the region division discrimination processing is forced to end.

Also, when the KEY2 block and its nine left-neighboring blocks do not have the same width, it is determined that region division errors have occurred. In step S1610, an error code "3" is set, and the region division discrimination processing is forced to end.

Furthermore, when the total number of the KEY3 block and its neighboring blocks having the same Y1 coordinate as that of the KEY3 block is 3 or less or 7 or more, it is determined that region division errors have occurred. In step S1610, an error code "3" is set, and the region division discrimination processing is forced to end.

Likewise, the identification results in the case of the page type="non-head type" are checked in detail.

If it is determined by checking the identification results that the item identification processing has normally ended, it is determined that no region division processing errors have occurred. Then, an error code "0" is set in step S1607, and the region division discrimination processing ends.

The actual error type may be displayed, and at the same time, a rectangular image which may have caused errors of those to be displayed on the original image in the region division error correction processing may be displayed while changing its color, pattern, shape, and the like.

For example, in the case of FIG. 14, since it is determined as a result of checking the identification result of the page type that region division errors have occurred, the block B1402 may be displayed by "displaying the frame in red", "painting the interior of the region in red", "displaying the frame as a dotted line frame", "flickering the frame", or the like.

Second Embodiment

The processing to be executed in the second embodiment will be described below with reference to the flow chart in FIG. 17. Note that the processing to be executed in the second embodiment is executed by the image processing apparatus of the first embodiment shown in FIG. 1, and a detailed description of the apparatus will be omitted.

Figure 17:
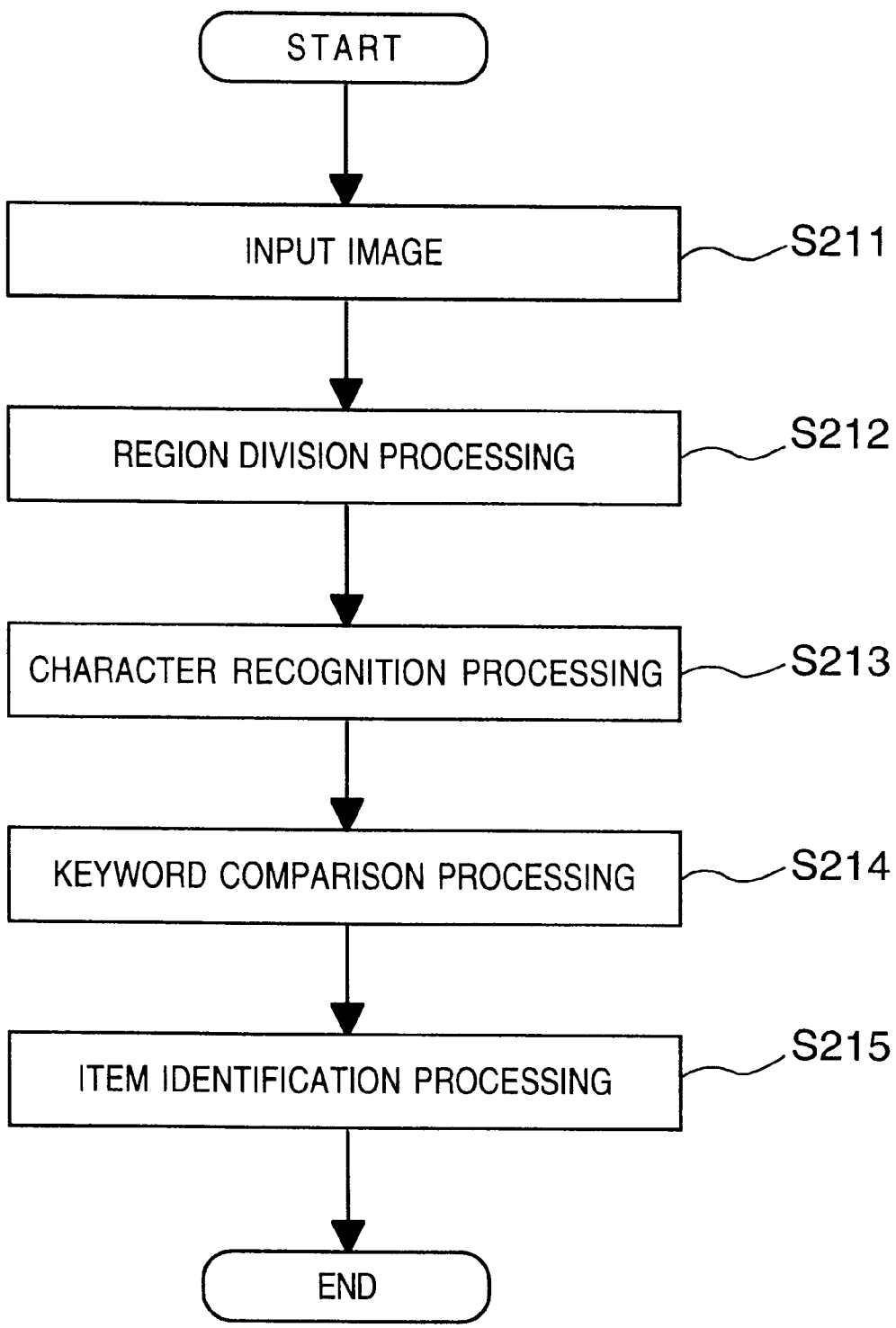
FIG. 17 is a flow chart showing the processing flow of the processing executed in the second embodiment.

FIG. 17 is a flow chart showing the processing flow of the processing to be executed in the second embodiment.

Note that the processing to be executed in the second embodiment is applied to a family register document or the like shown in FIG. 11. However, the present invention is not limited to such specific document. For example, any other original images may be used as long as they have predetermined layouts.

In step S211, an original image is read by the scanner 101 and is converted into binary image data. In step S212, the region division processing for dividing the obtained binary image data into regions in units of attributes (photographs, figures, characters, and the like) included in the binary image data is executed. In the second embodiment, when, especially, an item is extracted in the region division processing, information such as the coordinate data and the like of the item is stored as block data, as shown in FIG. 3.

As the attribute in the second embodiment, when text data is present in an item (a region surrounded by ruled lines), an attribute indicating this is stored, and "1" is stored in the validity flag. On the other hand, when no text data is present in an item (a region surrounded by ruled lines), an attribute indicating this is stored, and "0" is stored in the validity flag.

In step S213, character recognition processing for recognizing characters corresponding to text data present in the respective items is executed. Note that the character recognition processing is performed using an existing character recognition method, and is not limited to a specific method as long as characters can be recognized.

In step S214, keyword comparison processing for comparing the recognition results recognized in step S213 with predetermined keywords is executed. In step S215, item identification processing for specifying the type of original image and identifying the items that constitute the specified original image is performed on the basis of the comparison results of the keyword comparison processing. Note that an example of the item identification processing is the same as that in the first embodiment, and a detailed description thereof will be omitted.

As the keywords used in the keyword comparison processing, specific types of characters described in the items of the family register document are set as keywords for identifying the type of the original image, as shown in FIG. 18. Each keyword is set to have one-to-one correspondence with the lower 2 digits of the corresponding item identification ID.

The processing executed in step S213 in the flow chart in FIG. 17 will be described in detail below with reference to FIGS. 11 to 13 and FIGS. 18 to 20.

For example, assume that blocks B1201 to B1236 of a plurality of items shown in FIG. 12 are obtained as a result of the region division processing described in step S212 in FIG. 17 for the original image of the family register document shown in FIG. 11. Characters corresponding to text data included in the respective items are recognized. Subsequently, the keyword comparison processing is performed using the recognition results, the addresses indicating the block data of the corresponding items, and the items. Thereafter, item identification IDs obtained as a result of the comparison processing are stored in, e.g., the RAM 107 as a data group, as shown in FIG. 19. At this time, since the keyword comparison processing is not performed yet, the lower 2 digits of the item identification ID of each item are set to be "0" as an initial value.

The recognition results and the keywords shown in FIG. 18 are compared, and a recognition result that matches a given keyword is assigned the lower 2 digits of the item identification ID corresponding to the keyword. For example, in the data group shown in FIG. 19, the lower 2 digits of the item identification IDs are set, as shown in FIG. 20. That is, a recognition result that matches a given keyword is assigned the lower 2 digits of the corresponding item identification ID, and a recognition result that does not match any keywords remains assigned "0" as the initial value.

Subsequently, the page type of family register document is specified on the basis of the types of recognition results that match the keywords in the keyword comparison processing.

As can be seen from the data group shown in FIG. 20, since the recognition result recognized as "本籍" (birth place) matches the corresponding keyword, the page type of family register document is specified to be "head type". As a consequence, the item identification ID of the page type of this family register document is determined to be "1000", as shown in FIG. 4A. On the other hand, the type of person listed on the page of the family register document is specified to be the head as the person listed on the page since the page type is determined to be "head type". As a consequence, the item identification ID of the person listed on the page of this family register document is determined to be "000", as shown in FIG. 4B. However, when the page type of family register document is specified to be "non-head type", two different persons listed on the page of the family register document are available, and the item identification ID of the person listed on the page of this family register document is determined to be "100" or "200" on the basis of the positional relationship among the items of the family register document, as shown in FIG. 4B.

Furthermore, item identification IDs are determined for the remaining recognition results that match the keywords on the basis of FIG. 4C. For example, the item identification ID of the recognition result recognized as "本籍" (birth place) is determined by 1000 (the page type is "head type")+000 (the head is the person listed on the page)+10 (title "本籍" (birth place)=1010.

Thereafter, the item identification IDs of the recognition results that do not match any keywords are determined. In this case, the item identification IDs of the recognition results that do not match any keywords are determined on the basis of the positional relationship among the items listing the recognition results that match the corresponding keywords.

For example, since the block B1202 shown in FIG. 12 is located underneath the block B1201 (the item having the recognition result "本籍" (birth place)), the item identification ID of which is determined to be "1010", the block B1202 is identified to be an item listing "address", and its item identification ID is determined to be "1011".

In this way, the item identification IDs are determined for all the items. In the case of the family register document in FIG. 11, the determination results of the item identification IDs shown in FIG. 13 are obtained. A desired region surrounded by ruled lines is extracted by designating its item identification ID.

As described above, according to the second embodiment, the regions surrounded by ruled lines included in the original image can be specified and identified. Also, by designating the item identification IDs determined for the specified regions, a desired region surrounded by ruled lines can be extracted.

Since the above-mentioned region division processing, character recognition processing, keyword comparison processing, and item identification processing are provided so that regions surrounded by ruled lines can be extracted, a region surrounded by ruled lines corresponding to a desired item can be selected, thus improving the operability and shortening the overall processing time.

In the second embodiment, one keyword corresponding to the lower 2 digits of each item identification ID is used in the keyword comparison processing. However, for example, two or more keywords may be set in correspondence wit h the lower 2 digits of each item identification ID, as shown in FIG. 21.

With this arrangement, for example, when the character recognition of text data indicating "出生" (birth place) is performed from the left side, and the recognition result "籍本" (ecalp htrib) is obtained, since the two recognition results "本籍" (birth place) and "籍本" (ecalp htrib) are recognized to indicate an identical item, the written direction of text data as the object to be recognized in the character recognition processing need no longer be considered.

In the second embodiment, characters described in specific types of items are used as keywords in the keyword comparison processing. Alternatively, characters in items other than the predetermined keyword s obtained after the item identification processing may be used as keywords. For example, in addition to the predetermined keywords, the lower 2 digits of the item identification ID of an item listing "夫" (husband), "妻" (wife), or the like are determined to be "50". As the keywords of the item identification processing of other original images (see FIG. 22), "夫" (husband), "妻" (wife), or the like can be used, and hence, the load on the processing for determining the item identification IDs of the recognition results that do not match any keywords in the item identification processing can be reduced.

In the character recognition processing of the second embodiment, even when the first candidate of the recognition candidates of text data as the object to be recognized does not match a given keyword, when a combination of the second and subsequent recognition candidates including the first candidate matches the keyword, the object to be recognized matches the keyword with high probability. In such case, it may be determined that the recognition result matches the keyword.

For example, when the first to fourth candidates are obtained, as shown in FIG. 23, as the recognition candidates obtained by the character recognition of text data described in block B1201 in FIG. 12, it is determined that the first candidate does not match the keyword "本籍" (birth place) in this case). However, by combining characters included in the first and third candidates, the combined characters match the keyword ("本籍" (birth place)), and it is determined that the first candidate matches the keyword "本籍" (birth place)). In this manner, even when the individual recognition candidates of the object to be recognized are erroneously recognized ones that do not match the keyword, it can be determined that the object to be recognized matches the keyword.

Note that keyword matching block display processing for displaying text data matching keywords and regions that surround text data by ruled lines to be distinguished from other regions by, e.g., changing their colors, shapes, or states may be added after the keyword comparison processing in step S214 described above.

With this arrangement, when the operator is informed of the regions, which surround text data matching the keywords by ruled lines, by changing, e.g., their colors, he or she can easily check, based on the number of text data that match the keywords, the recognition results obtained, e.g., when density adjustment failures or the like upon reading an image impair the recognition rate, and character candidates of the recognition results do not include any right-answer characters.

Figure 24:
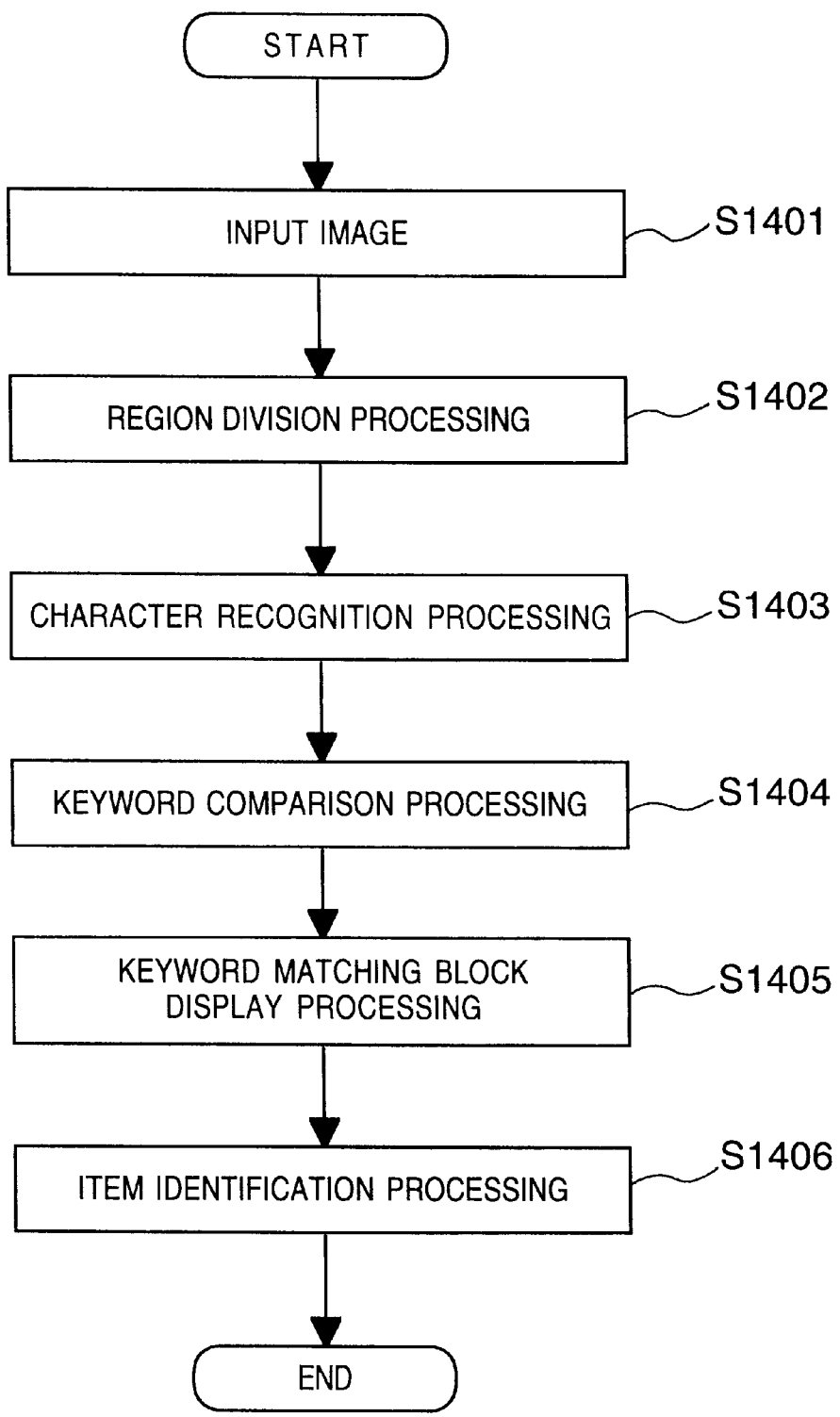
FIG. 24 is a flow chart showing the processing flow of another processing executed in the second embodiment.

For example, the above-mentioned processing is easily realized by the flow chart shown in FIG. 24 in which the above-mentioned arrangement is added after the keyword comparison processing in step S214 in the flow chart in FIG. 17.

FIG. 24 is a flow chart showing the processing flow of another processing to be executed in the second embodiment.

In step S1401, an original image is read by the scanner 101 and is converted into binary image data. In step S1402, the region division processing for dividing the obtained binary image data into regions in units of attributes (photographs, figures, characters, and the like) included in the binary image data is executed. In the second embodiment, when, especially, an item is extracted in the region division processing, information such as the coordinate data and the like of the item is stored as block data, as shown in FIG. 3. In addition, information such as the coordinate data and the like of the divided item is stored as block data, as shown in FIG. 3.

In step S1403, character recognition processing for recognizing characters corresponding to text data present in the respective items is executed. In step S1404, keyword comparison processing for comparing the recognition results recognized in step S1403 with predetermined keywords is executed. In step S1405, keyword matching block display processing for displaying text data matching the keywords and regions that surround the text data by ruled lines to be distinguished from other regions by changing, e.g., their colors, shapes, or states is executed. In step S1406, item identification processing for specifying the type of original image on the basis of the comparison results in the keyword comparison processing, and identifying items that constitute the specified original image is executed.

Third Embodiment

The processing to be executed in the third embodiment will be described below with reference to the flow chart in FIG. 25. Note that the processing to be executed in the third embodiment is executed by the image processing apparatus of the first embodiment shown in FIG. 1, and a detailed description of the apparatus will be omitted.

Figure 25:
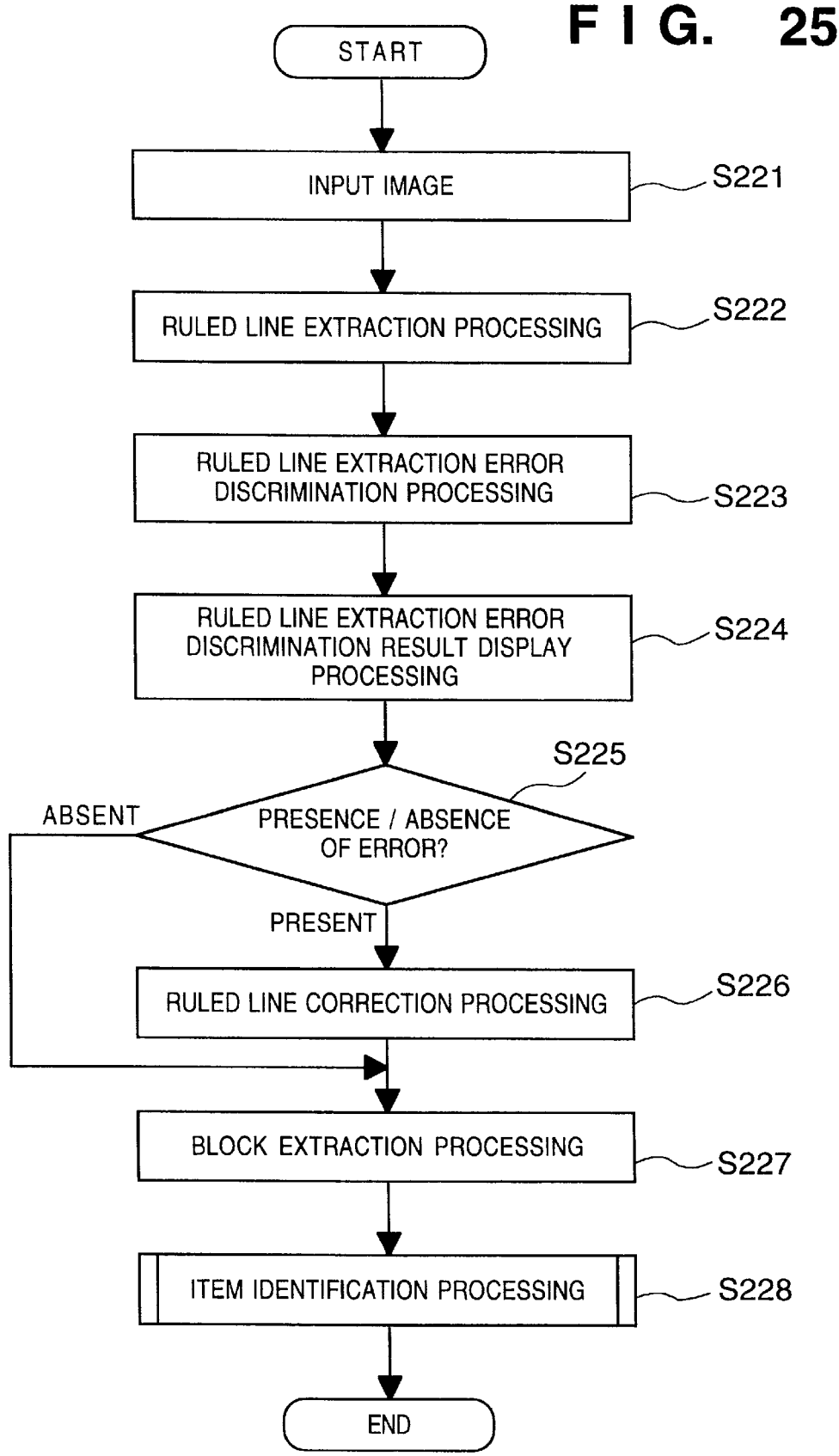
FIG. 25 is a flow chart showing the processing flow of the processing executed in the third embodiment.

FIG. 25 is a flow chart showing the processing flow of the processing to be executed in the third embodiment.

Note that the processing to be executed in the third embodiment is applied to a family register document or the like shown in FIG. 11. However, the present invention is not limited to such specific document. For example, any other original images may be used as long as they have predetermined layouts.

In step S221, an original image is read by the scanner 101 and is converted into binary image data. In step S222, ruled line extraction processing for extracting ruled lines included in the binary image data is executed. Subsequently, information such as coordinate data and the like of the extracted ruled lines is stored as block data, as shown in FIG. 3.

For example, when the ruled line extraction processing in step S222 described above is performed for a family register document shown in FIG. 11, ruled lines included in the family register document are extracted, and the type of family register document and items that constitute the family register document are identified on the basis of the positions, lengths, number, and the like of the extracted ruled lines.

When the processing result of the ruled line extraction processing include ruled lines 701, 702, and 703, as shown in FIG. 26, the page type as the type of layout of items of the family register document is identified to be a page type listing the head, i.e., "head type". On the other hand, when the processing result includes neither the ruled line 701 nor the ruled line 702, and the X1 coordinate of the ruled line 703 is equal to that of an upper end ruled line 704 or a lower end ruled line 705, the page type is identified to be a page type without any head, i.e., "non-head type".

Furthermore, the family register document is identified by the number of vertical ruled lines depending from the ruled line 703. For example, the family register document shown in FIG. 26 is identified to be of a type additionally listing both the adoptive father and mother.

In step S223, ruled line extraction error discrimination processing for discriminating the presence/absence of errors in the ruled line extraction processing is executed on the basis of the ruled lines obtained by the ruled line extraction processing in step S222 described above. The presence/absence of errors in the ruled line extraction processing is discriminated by comparing the ruled lines obtained by the ruled line extraction processing in step S222 above and those of the family register document (see FIG. 11) having the predetermined layout of the ruled lines. Note that the family register document (see FIG. 11) having the predetermined layout of the ruled lines is stored in the RAM 107.

The presence of errors in the ruled line extraction processing is determined, for example, when the ruled line of the original image read by the scanner 101 is blurred and cannot be extracted like a ruled line 801, or when the extracted ruled line becomes shorter than an original ruled line like a ruled line 803, as shown in FIG. 27. If the processing continues in this state, processing errors may occur in block extraction processing (step S227; to be described later), and the type and items of the family register document cannot be identified.

In step S224, ruled line extraction error discrimination result display processing for displaying the processing result of the ruled line extraction error discrimination processing on the display 108 is executed. It is checked in step S225 based on the processing result of the ruled line extraction error discrimination result display processing if errors have occurred in the ruled line extraction processing. If no errors have occurred in the ruled line extraction processing, a message indicating that the processing has normally ended is displayed on the display 108, and the flow advances to step S227. On the other hand, if errors have occurred in the ruled line extraction processing, a message indicating that errors have occurred in the ruled line extraction processing is displayed on the display 108 to prompt the operator to correct the errors in the ruled line extraction processing, and the flow then advances to step S226.

In step S226, after the message indicating that errors have occurred in the ruled line extraction processing is displayed by the ruled line extraction error discrimination result display processing, the current ruled line extraction state is displayed on the original image. Then, the operator performs ruled line correction processing for correcting the processing result of the ruled line extraction processing by means of image processing, e.g., by enlarging, reducing, moving, or deleting the object to be corrected, or creating a new block.

The corrected result is reflected when the operator presses, e.g., a correction end button using the mouse 103, and the block data corresponding to the corrected item is updated. Thereafter, the flow advances to step S227.

For example, when the message indicating that errors have occurred in the ruled line extraction processing is displayed on the display 108 in the ruled line extraction error discrimination result display processing, the processing result (FIG. 27) is displayed on the original image (the family register document in FIG. 11).

Figure 28:
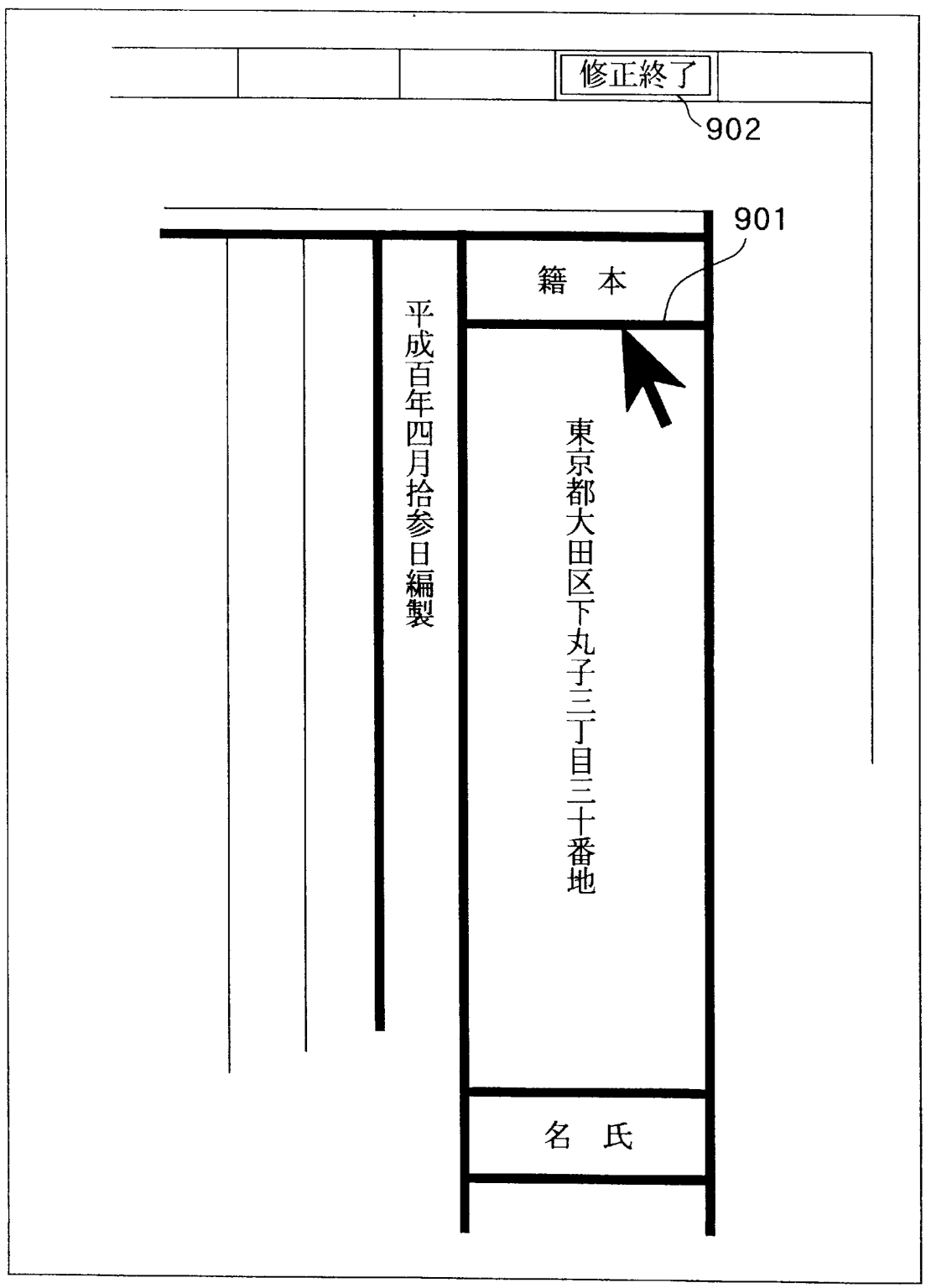
FIG. 28 is a view showing the processing for correcting the processing result obtained when errors have occurred in the ruled line extraction processing executed for the original image in the third embodiment.

When the current processing result (FIG. 27) is displayed on the original image, the operator creates a new ruled line 901 as the non-extracted ruled line 801 (FIG. 27), as shown in FIG. 28. Likewise, the operator corrects the ruled line 803 (FIG. 27; not shown in FIG. 28).

When the operator presses the correction end button (902) using the mouse 103, the contents of the blocks of the corrected items are updated to have the corresponding block data.

In step S227, block extraction processing for extracting regions (items) surrounded by the ruled lines included in the original image is performed. Thereafter, information such as coordinate data and the like of the extracted items is stored as block data, as shown in FIG. 3.

In step S228, item identification processing for specifying the layout of the items of the original image on the basis of format information indicating the layout of the items of the original image, and identifying items that constitute the original image is performed. Since an example of the item identification processing is the same as that in the first embodiment, a detailed description thereof will be omitted.

As described above, according to the third embodiment, since the layout of the ruled lines included in the original image is identified, the presence/absence of processing errors in the ruled line extraction processing can be checked. Even when processing errors have occurred in the ruled line extraction processing, they can be corrected.

The region division processing can be accurately performed since it is performed based on the extracted ruled lines or corrected ruled lines.

Furthermore, since the above-mentioned ruled line extraction processing, ruled line extraction error discrimination processing, ruled line extraction error discrimination result display processing, block extraction processing, and item identification processing are provided so that errors in the ruled line extraction processing can be corrected, the presence/absence of errors can be easily checked, thus improving the operability and shortening the overall processing time.

In this way, the block extraction results classified in units of items can be obtained.

When it is determined in the ruled line extraction error discrimination processing that ruled line extraction errors have occurred, a ruled line, which may have been erroneously extracted, may be displayed on the original image to be easily distinguished from other ruled lines by changing its color or shape.

Note that the processing for further discriminating the presence/absence of errors in the block extraction processing in step S227 on the basis of the processing result of the item identification processing in step S228 above, and prompting the operator to correct the errors in the block extraction processing may be added.

Figure 29:
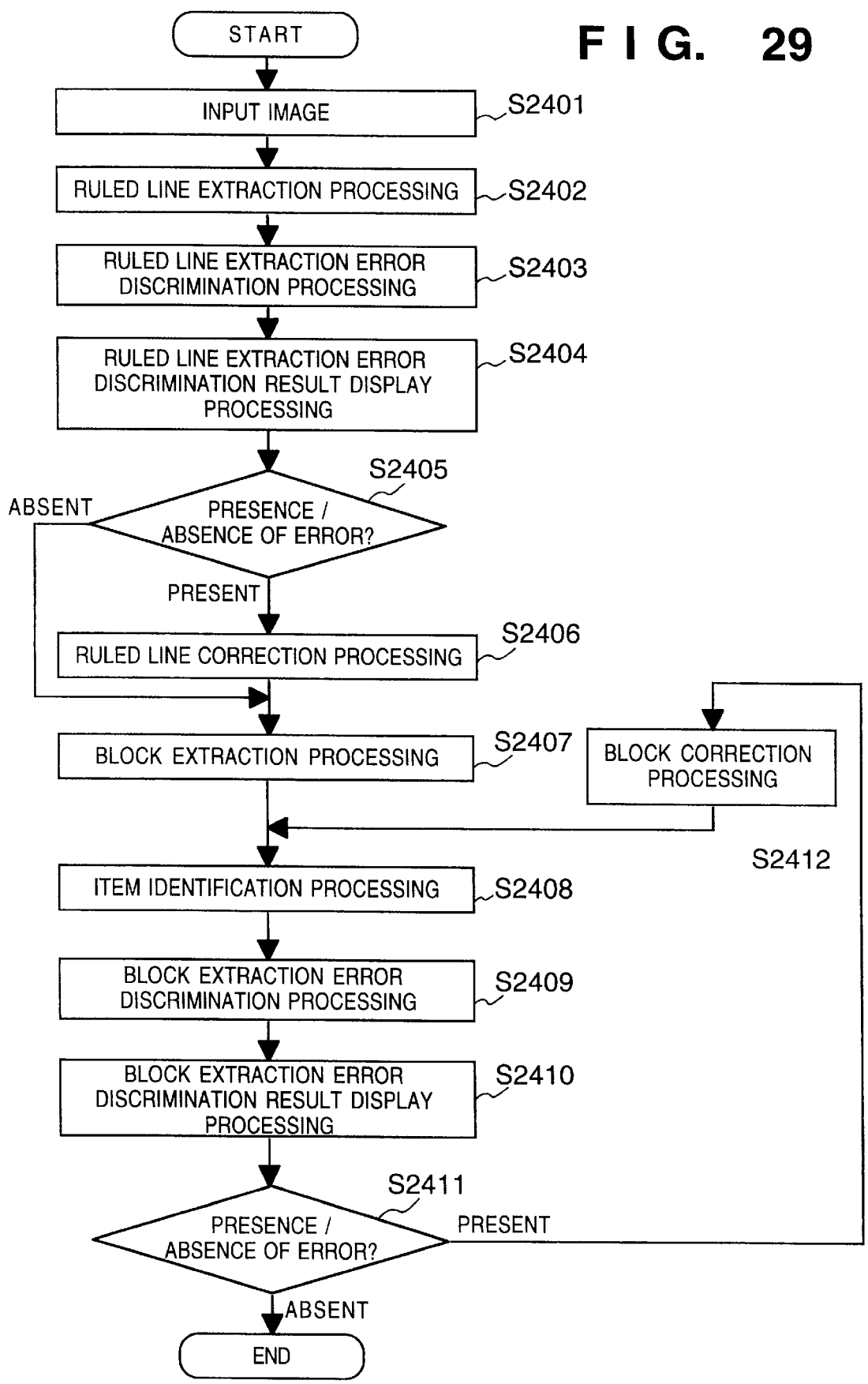
FIG. 29 is a flow chart showing the processing flow of another processing executed in the third embodiment.

For example, the above-mentioned processing can be easily realized by the flow chart shown in FIG. 29 in which the above-mentioned arrangement is added after the item identification processing in step S228 in the flow chart in FIG. 25.

FIG. 29 is a flow chart showing the processing flow of another processing executed in the third embodiment.

In step S2401, an original image is read by the scanner 101 and is converted into binary image data. In step S2402, ruled line extraction processing for extracting ruled lines included in the binary image data is executed. Subsequently, information such as coordinate data and the like of the extracted ruled lines is stored as block data, as shown in FIG. 3.

In step S2403, the ruled line extraction error discrimination processing for discriminating the presence/absence of errors in the ruled line extraction processing is executed on the basis of the ruled lines obtained by the ruled line extraction processing in step S2402 above.

In step S2404, the ruled line extraction error discrimination result display processing for displaying the processing result of the ruled line extraction error discrimination processing on the display 108 is executed. It is checked in step S2405 based on the processing result of the ruled line extraction error discrimination result display processing if errors have occurred on the ruled line extraction processing. If no errors have occurred in the ruled line extraction processing, a message indicating that the processing has normally ended is displayed on the display 108, and the flow advances to step S2407. On the other hand, if errors have occurred in the ruled line extraction processing, a message indicating that errors have occurred in the ruled line extraction processing is displayed on the display 108 to prompt the operator to correct the errors in the ruled line extraction processing. Thereafter, the flow advances to step S2406.

In step S2406, after the message indicating that errors have occurred in the ruled line extraction processing is displayed by the ruled line extraction error discrimination result display processing, the current ruled line extraction state is displayed on the original image. Then, the operator performs ruled line correction processing for correcting the processing result of the ruled line extraction processing by means of image processing, e.g., by enlarging, reducing, moving, or deleting the object to be corrected, or creating a new block.

The corrected result is reflected when the operator presses, e.g., a correction end button using the mouse 103, and the block data corresponding to the corrected item is updated. Thereafter, the flow advances to step S2407.

In step S2407, the block extraction processing for extracting regions (items) surrounded by the ruled lines included in the original image is performed. Thereafter, information such as coordinate data and the like of the extracted items is stored as block data, as shown in FIG. 3.

In step S2408, the item identification processing for specifying the layout of the items of the original image on the basis of format information indicating the layout of the items of the original image, and identifying items that constitute the original image is performed. Since an example of the item identification processing is the same as that in step S228 in FIG. 25, a detailed description thereof will be omitted.

In step S2409, block extraction error discrimination processing for discriminating the presence/absence of errors in the block extraction processing is performed on the basis of the items obtained by the block extraction processing in step S2407 above.

Figure 30:
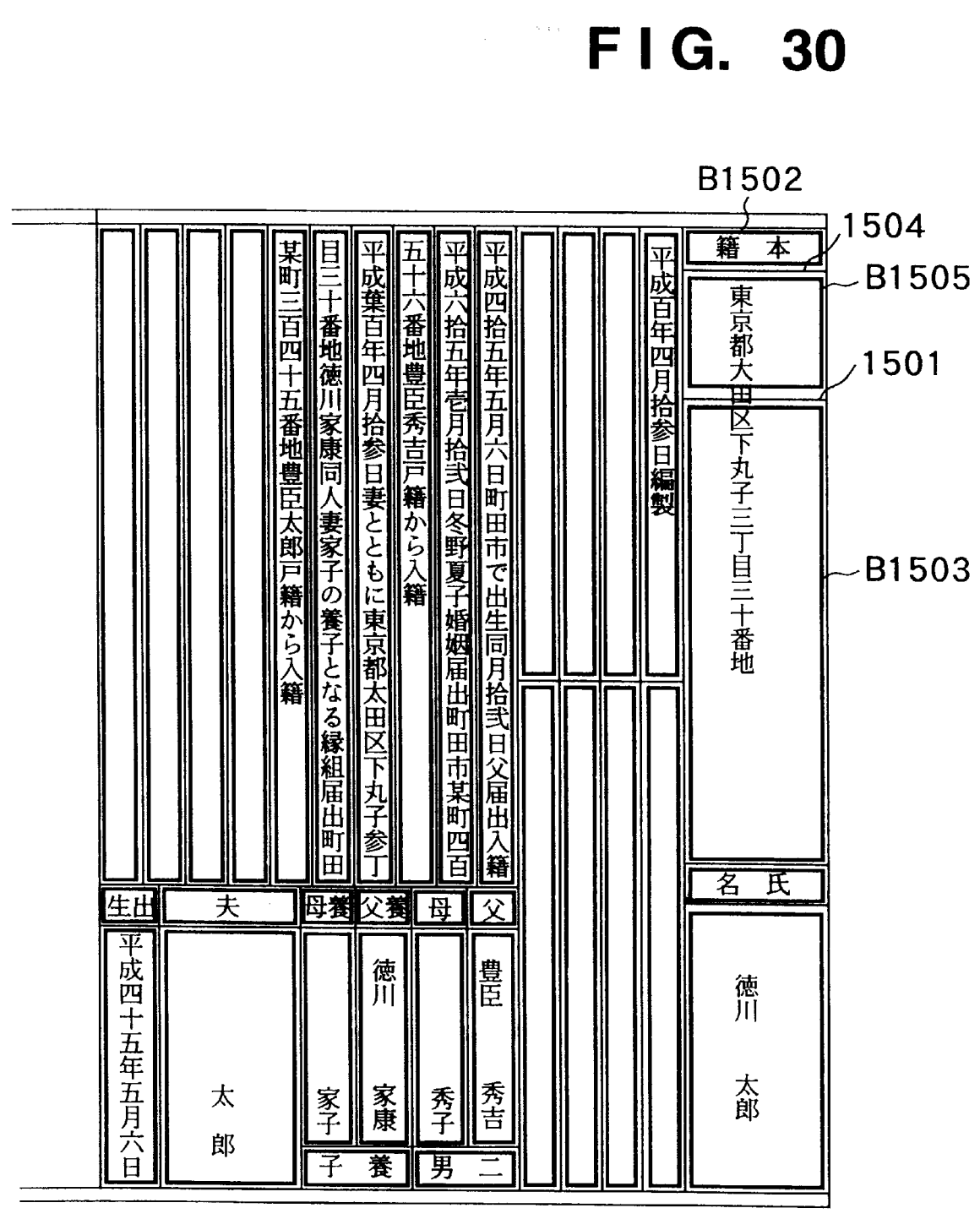

In the following case, it is determined that errors have occurred in the block extraction processing. For example, when a ruled line 1501 shown in FIG. 30 is erroneously detected by the ruled line extraction processing owing to characters that overlap the ruled lines included in the original image, noise, and the like, a block which should not be separately extracted is separately extracted as blocks B1505 and B1503 by the block extraction processing. In this case, this original image is determined to be of "head type" in the ruled line extraction processing due to the presence of a ruled line 1504 and the like, and it is determined in the ruled line extraction error discrimination processing that no errors have occurred. In the block extraction processing, since the width of a block B1502 is larger than its height, "head type" is determined. However, since the width of the block B1505 underneath the block B1502 is larger than its height, this fact is contradictory to the determination of "head type". As a consequence, in this case, it is determined that errors have occurred in the block extraction processing.

In step S2410, block extraction error discrimination result display processing for displaying the processing result in the block extraction error discrimination processing on the display 108 is performed. In step S2411, it is checked based on the processing result in the block extraction error discrimination result display processing if errors have occurred in the block extraction processing. If no errors have occurred in the block extraction processing, a message indicating that the processing has normally ended is displayed on the display 108. On the other hand, if errors have occurred in the block extraction processing, a message indicating that errors have occurred in the block extraction processing is displayed on the display 108 to prompt the operator to correct the errors in the block extraction processing. Thereafter, the flow advances to step S2412.

After the message indicating that errors have occurred in the block extraction processing is displayed on the display 108 by the block extraction error discrimination result display processing, the current block extraction state of the items is displayed on the original image in step S2412. Then, the operator performs block correction processing for correcting the block extraction processing by means of image processing, e.g., by enlarging, reducing, moving, or deleting the object to be corrected, or creating a new block.

The corrected result is reflected when the operator presses, e.g., a correction end button using the mouse 103, and the block data corresponding to the corrected item is updated. Thereafter, the item identification processing is executed again in step S2408.

For example, when the message indicating that errors have occurred in the block extraction processing is displayed in the block extraction error discrimination result display processing, the processing result (FIG. 30) is displayed on the original image (the family register document in FIG. 11).

Figure 31:
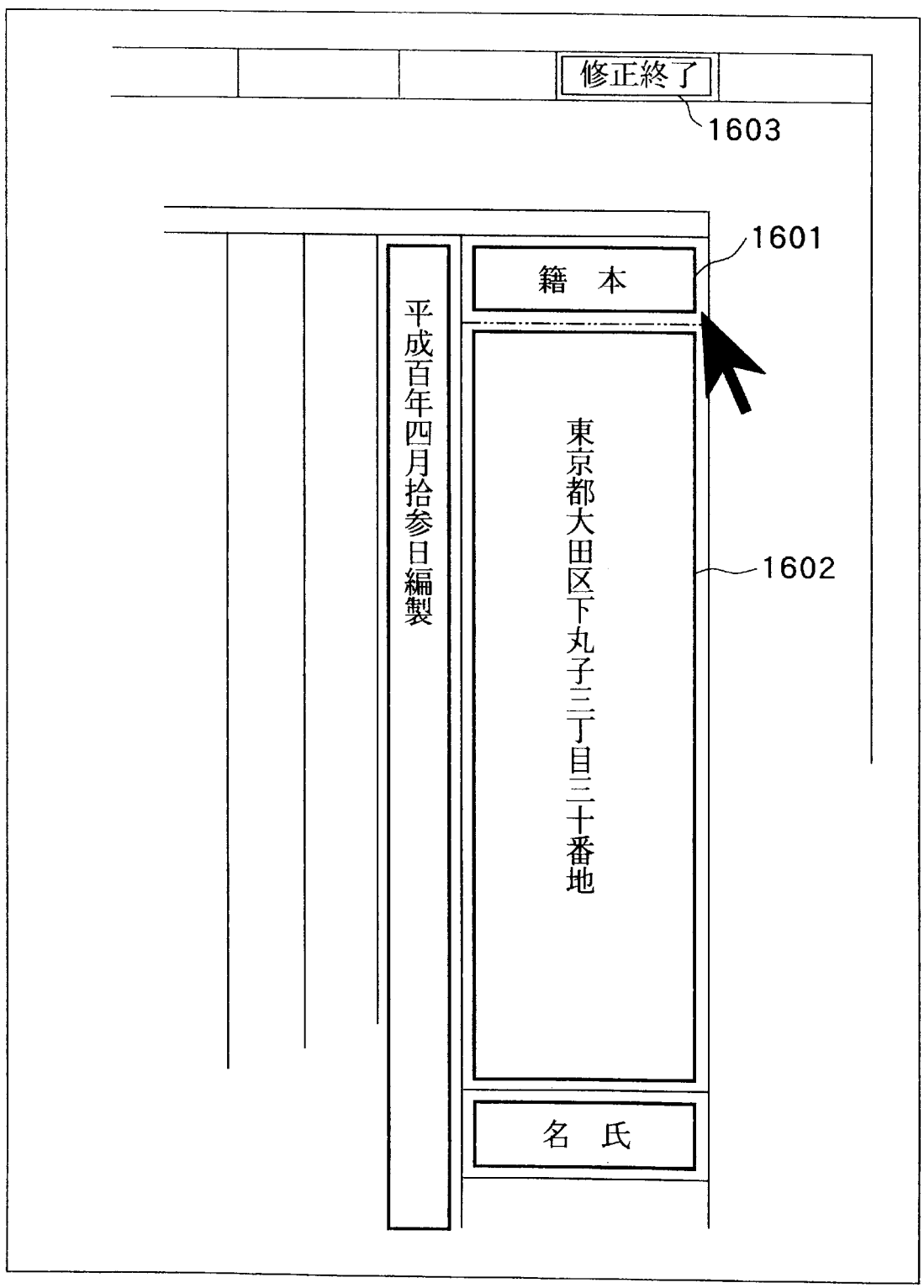
FIG. 31 is a view showing the processing for correcting the processing result obtained when errors have occurred in the block extraction processing executed for the original image in the third embodiment.

When the current processing result (FIG. 30) is displayed on the original image, the operator deletes the erroneously extracted block B1505 from the result, and modifies and corrects the block B1503 like a block 1602, as shown in FIG. 31.

When the operator presses the correction end button (1602) using the mouse 103, the contents of the blocks of the corrected items are updated to have the corresponding block data. Thereafter, the item identification processing is executed again.

The block extraction discrimination processing is performed again based on the result of the item identification result. In this case, since the errors in the block extraction processing have been corrected, a message indicating this is displayed on the display 108 by the block extraction discrimination result display processing, and thereafter, the processing normally ends.

When errors in the ruled line extraction processing are detected in the ruled line extraction error discrimination processing, it may be selected whether correction processing for correcting the ruled lines in the ruled line correction processing is performed or the block extraction processing is performed while the ruled lines are left uncorrected, and correction processing for correcting a block including the errors in the ruled line extraction processing is performed. With this arrangement, the correction processing that can shorten the processing time further can be selected. Consequently, the overall processing can be efficiently executed.

Figure 32:
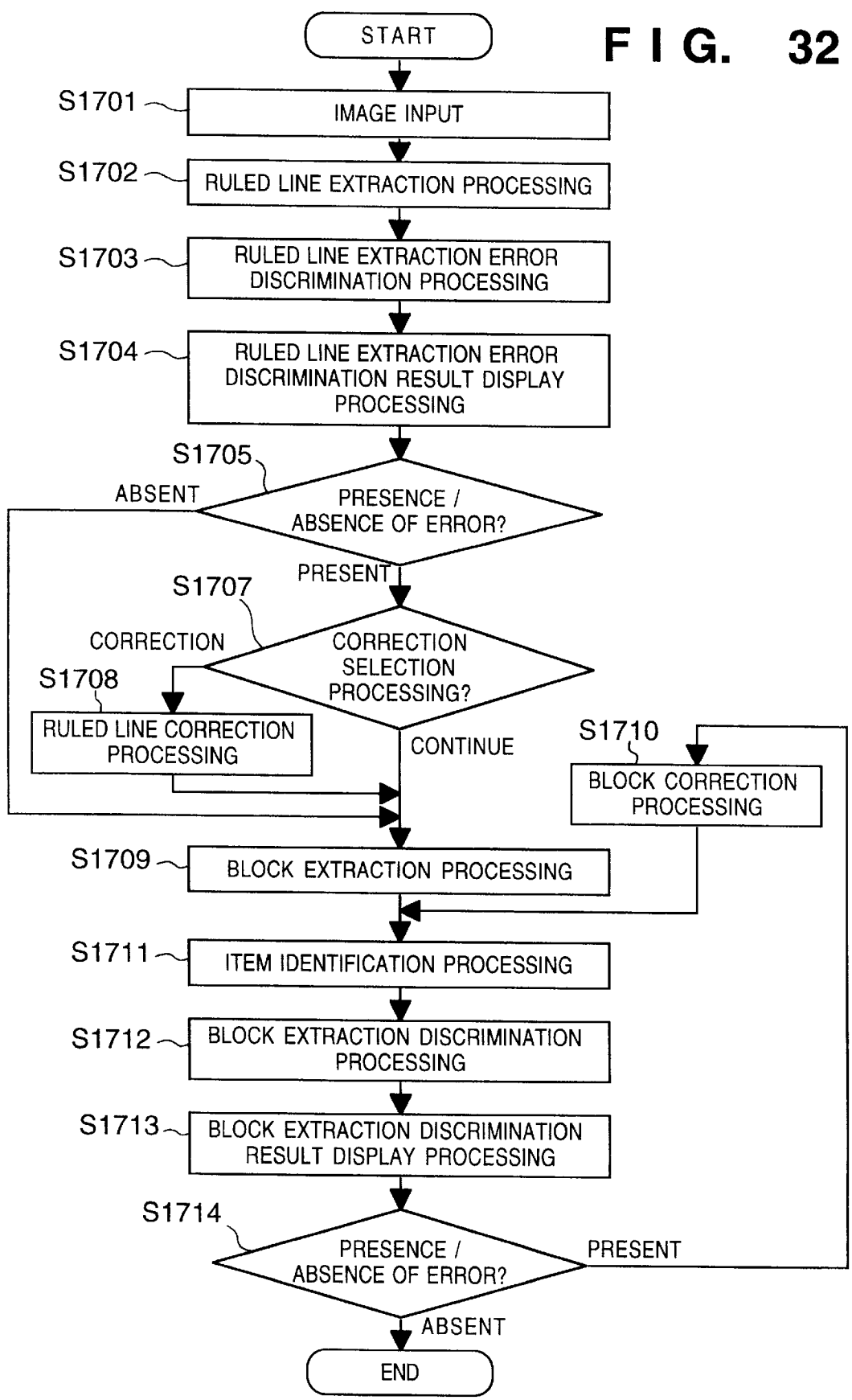
FIG. 32 is a flow chart showing the processing flow of still another processing executed in the third embodiment.

For example, the above-mentioned processing is easily realized by the flow chart shown in FIG. 32 in which the above-mentioned arrangement is added after step S2405 in the flow chart in FIG. 29.

FIG. 32 is a flow chart showing the processing flow of still another processing executed in the third embodiment.

In step S1701, an original image is read by the scanner 101 and is converted into binary image data. In step S1702, ruled line extraction processing for extracting ruled lines included in the binary image data is executed. Subsequently, information such as coordinate data and the like of the extracted ruled lines is stored as block data, as shown in FIG. 3.

In step S1703, the ruled line extraction error discrimination processing for discriminating the presence/absence of errors in the ruled line extraction processing is executed on the basis of the ruled lines obtained by the ruled line extraction processing in step S1702 above.

In step S1704, the ruled line extraction error discrimination result display processing for displaying the processing result of the ruled line extraction error discrimination processing on the display 108 is executed. It is checked in step S1705 based on the processing result of the ruled line extraction error discrimination result display processing if errors have occurred on the ruled line extraction processing. If no errors have occurred in the ruled line extraction processing, a message indicating that the processing has normally ended is displayed on the display 108, and the flow advances to step S1709. On the other hand, if errors have occurred in the ruled line extraction processing, a message indicating that errors have occurred in the ruled line extraction processing is displayed on the display 108, and the flow advances to step S1707.

In step S1707, correction selection processing for prompting the operator to select whether or not errors in the ruled line extraction processing are to be corrected is performed. If the operator wants to correct errors, the flow advances to step S1708. On the other hand, if the operator wants to continue the processing without correcting any errors, the flow advances to step S1709.

In step S1708, after the message indicating that errors have occurred in the ruled line extraction processing is displayed by the ruled line extraction error discrimination result display processing, the current ruled line extraction state is displayed on the original image. Then, the operator performs ruled line correction processing for correcting the processing result of the ruled line extraction processing by means of image processing, e.g., by enlarging, reducing, moving, or deleting the object to be corrected, or creating a new block.

The corrected result is reflected when the operator presses, e.g., a correction end button using the mouse 103, and the block data corresponding to the corrected item is updated. Thereafter, the flow advances to step S1709.

In step S1709, the block extraction processing for extracting regions (items) surrounded by the ruled lines included in the original image is performed. Thereafter, information such as coordinate data and the like of the extracted items is stored as block data, as shown in FIG. 3.

Subsequently, in step S1711, the item identification processing for specifying the layout of the items of the original image on the basis of format information indicating the layout of the items of the original image, and identifying items that constitute the original image is performed. Since an example of the item identification processing is the same as that in step S228 in FIG. 25, a detailed description thereof will be omitted.

In step S1712, block extraction error discrimination processing for discriminating the presence/absence of errors in the block extraction processing is performed on the basis of the items obtained by the block extraction processing in step S1709 above.

In step S1713, block extraction error discrimination result display processing for displaying the processing result in the block extraction error discrimination processing on the display 108 is performed. In step S1714, it is checked based on the processing result in the block extraction error discrimination result display processing if errors have occurred in the block extraction processing. If no errors have occurred in the block extraction processing, a message indicating that the processing has normally ended is displayed on the display 108. On the other hand, if errors have occurred in the block extraction processing, a message indicating that errors have occurred in the block extraction processing is displayed on the display 108 to prompt the operator to correct the errors in the block extraction processing. Thereafter, the flow advances to step S1710.

In step S1710, after the message indicating that errors have occurred in the block extraction processing is displayed on the display 108 by the block extraction error discrimination result display processing, the current block extraction state of the items is displayed on the original image. Then, the operator performs block correction processing for correcting the block extraction processing by means of image processing, e.g., by enlarging, reducing, moving, or deleting the object to be corrected, or creating a new block.

The corrected result is reflected when the operator presses, e.g., a correction end button using the mouse 103, and the block data corresponding to the corrected item is updated. Thereafter, the item identification processing is executed again in step S1711.

The block extraction discrimination processing is performed again based on the result of the item identification result. In this case, since the errors in the block extraction processing have been corrected, a message indicating this is displayed on the display 108 by the block extraction discrimination result display processing, and thereafter, the processing normally ends.

Fourth Embodiment

The processing to be executed in the fourth embodiment will be described below with reference to the flow chart in FIG. 33. Note that the processing to be executed in the fourth embodiment is executed by the image processing apparatus of the first embodiment shown in FIG. 1, and a detailed description of the apparatus will be omitted.

Figure 33:
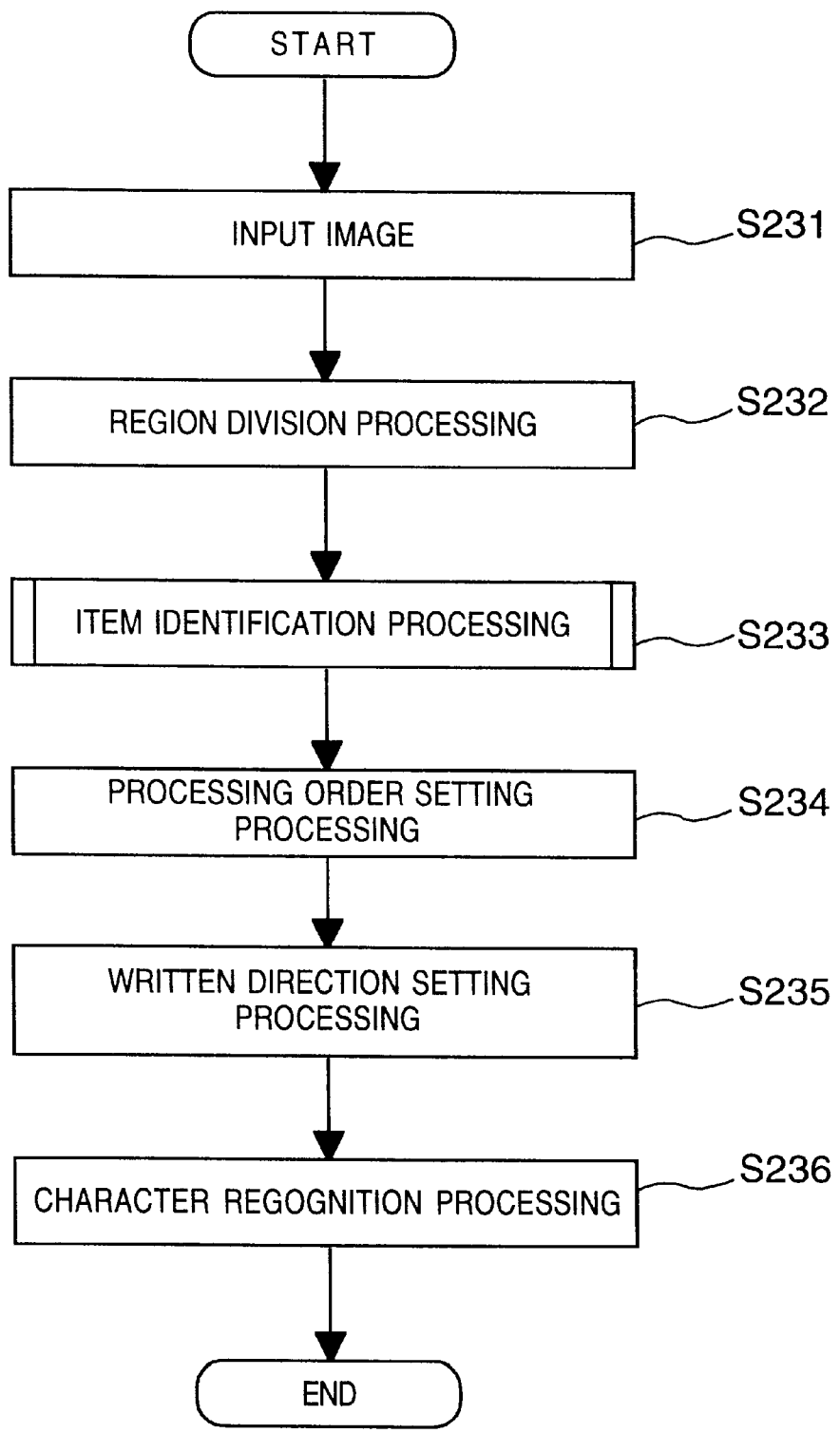
FIG. 33 is a flow chart showing the processing flow of the processing executed in the fourth embodiment.

FIG. 33 is a flow chart showing the processing flow of the processing to be executed in the fourth embodiment.

Note that the processing to be executed in the fourth embodiment is applied to a family register document or the like shown in FIG. 11. However, the present invention is not limited to such specific document. For example, any other original images may be used as long as they have predetermined layouts.

In step S231, an original image is read by the scanner 101 and is converted into binary image data. In step S232, the region division processing for dividing the obtained binary image data into regions in units of attributes (photographs, figures, characters, and the like) included in the binary image data is executed. In the fourth embodiment, when, especially, an item is extracted in the region division processing, information such as the coordinate data and the like of the item is stored as block data, as shown in FIG. 3.

As the attribute in the fourth embodiment, when text data is present in an item (a region surrounded by ruled lines), an attribute indicating this is stored, and "1" is stored in the validity flag. On the other hand, when no text data is present in an item (a region surrounded by ruled lines), an attribute indicating this is stored, and "0" is stored in the validity flag.

In step S233, item identification processing for specifying the layout of the items of the original image on the basis of format information indicating the layout of the items of the original image, and identifying items that constitute the original image is performed. Note that an example of the item identification processing is the same as that in the above embodiments, and a detailed description thereof will be omitted.

As described above, by the processing executed in steps S231 to S233, not only a family register document having a specific format but also family register documents (original images) having a plurality of different formats can be recognized.

Figure 34:
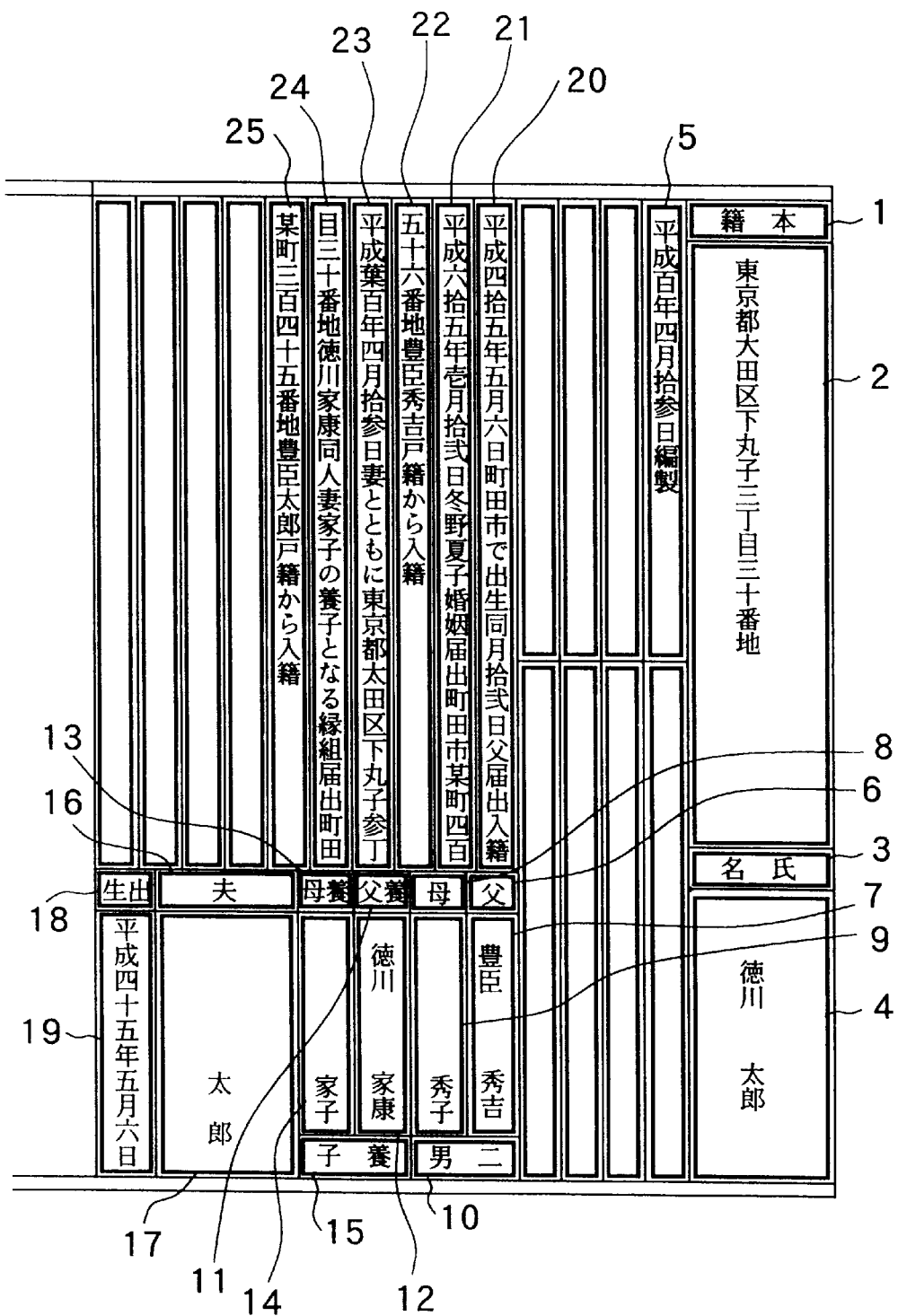
FIG. 34 is a view showing the setting result of the processing order set for an original image in the fourth embodiment.

In step S234, processing order setting processing for setting the processing order of character recognition processing to be performed for only the items with text data in the order from smaller item identification IDs assigned to the respective items in step S233 is performed. The processing order Nos. set for the respective items are stored in the recognition order areas of the corresponding block data. On the other hand, a flag "−1" indicating that no character recognition processing is performed is stored in block data corresponding to an item without any text data. For example, when the processing order setting processing is performed for the respective items assigned the item identification IDs, as shown in FIG. 13, the processing order Nos. 1 to 19 are set for the items with text data, as shown in FIG. 34.

In step S235, written direction setting processing for setting the written direction of text data present in each item set with the processing order in step S234 is performed. Note that the written direction is set by the following method. That is, a database of the written directions corresponding to the item identification ID values shown in FIG. 35 is pre-stored in the ROM 106, and the contents of the stored database are compared with the item identification IDs of the items to be processed, thereby setting the written directions of text data present in the respective items.

In step S236, character recognition processing for recognizing characters corresponding to text data present in the respective items is performed in accordance with the processing order set in step S234. Note that the character recognition processing is performed using the existing character recognition method, and is not limited to a specific method as long as characters can be recognized.

As described above, according to the present invention, characters present in the respective items can be recognized by identifying the layout of the items included in the family register document.

Since the above-mentioned region division processing, item identification processing, processing order setting processing, written direction setting processing, and character recognition processing are provided, so that characters corresponding to text data present in the respective items are recognized, the character recognition processing order of a plurality of different formats can be accurately determined, and deviations of the items upon reading an image using, e.g., the scanner can be coped with. Accordingly, the operability can be improved, and the overall processing time can be shortened.

Note that ruled line extraction processing for extracting ruled lines included in the original image may be added before the region division processing in step S232 above. By adding the ruled line extraction processing, the type of original image can be identified before the region division processing.

Figure 36:
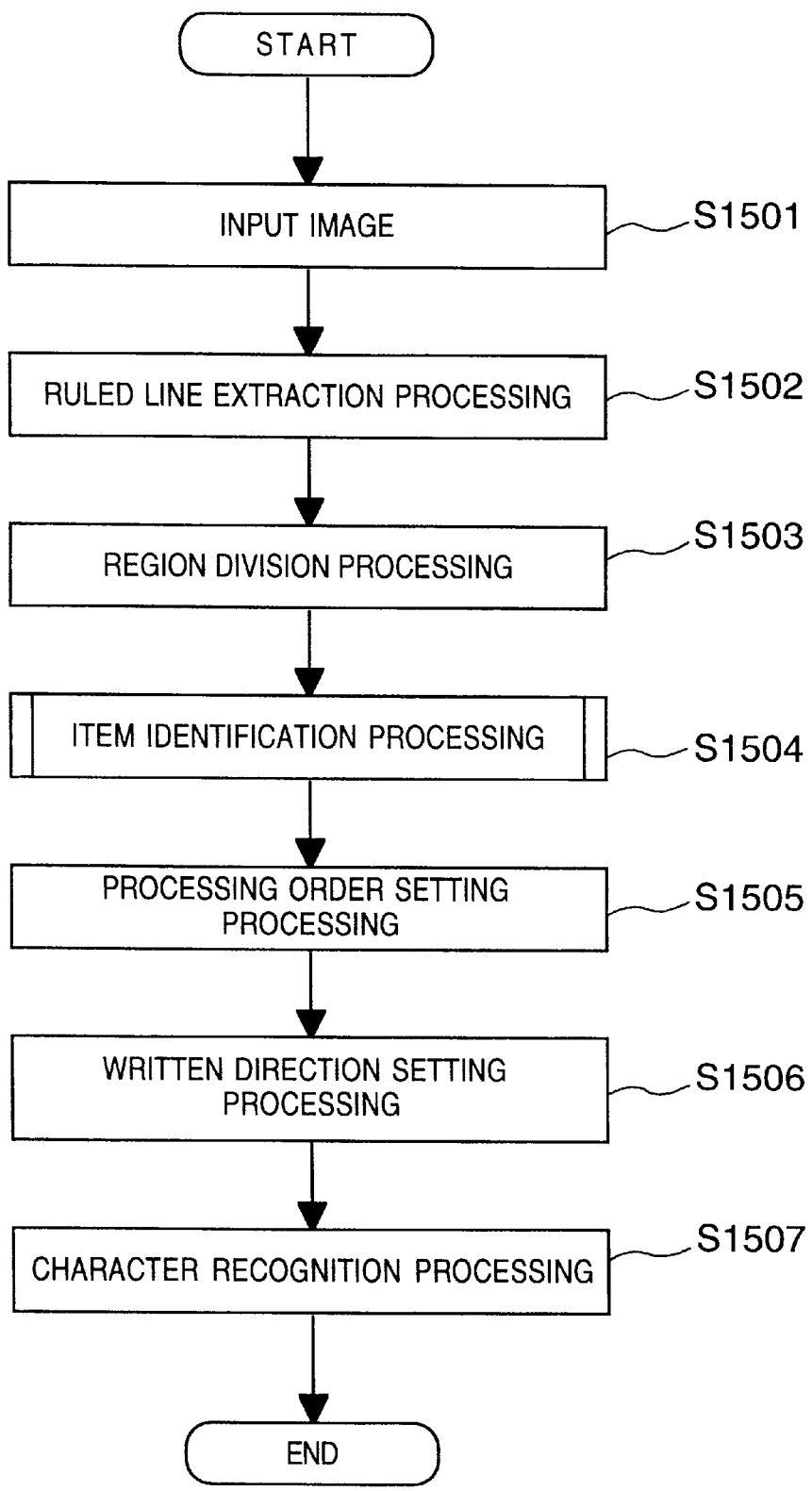
FIG. 36 is a flow chart showing the processing flow of another processing executed in the fourth embodiment.

For example, such processing can be easily realized by the flow chart shown in FIG. 36 in which the above-mentioned arrangement is added before the region division processing in step S232 in the flow chart in FIG. 33.

FIG. 36 is a flow chart showing the processing flow of another processing to be executed in the fourth embodiment.

In step S1501, an original image is read by the scanner 101 and is converted into binary image data. In step S1502, ruled line extraction processing for extracting ruled lines included in the binary image data is performed for the obtained binary image data. Information such as coordinate data and the like of the extracted ruled lines is stored as block data, as shown in FIG. 3.

In step S1503, the region division processing for dividing the obtained binary image data into regions in units of attributes (photographs, figures, characters, and the like) included in the binary image data is executed. In the fourth embodiment, when, especially, an item is extracted in the region division processing, information such as the coordinate data and the like of the item is stored as block data, as shown in FIG. 3. In addition, information such as the coordinate data and the like of the divided item is stored as block data, as shown in FIG. 3.

In step S1504, the item identification processing for specifying the layout of the items of the original image on the basis of format information indicating the layout of the items of the original image, and identifying items that constitute the original image is performed. Note that an example of the item identification processing is the same as that in step S233 in FIG. 33, and a detailed description thereof will be omitted.

In step S1505, the processing order setting processing for setting the processing order of character recognition processing to be performed for only the items with text data in the order from smaller item identification IDs assigned to the respective items in step S1504 is performed. In step S1506, the written direction setting processing for setting the written direction of text data present in each item set with the processing order in step S1505 is performed. In step S1507, the character recognition processing for recognizing characters corresponding to text data present in the respective items is performed in accordance with the processing order set in step S1505.

For example, assume that the processing result shown in FIG. 26 is obtained when the ruled line extraction processing is executed for the family register document in FIG. 11. In this case, if ruled lines 701, 702, and 703 are extracted, the page type of family register document is identified to be "head type". On the other hand, if neither the ruled line 701 nor the ruled line 702 are extracted and the X1 coordinate of the ruled line 703 is equal to that of an upper end ruled line 704 or a lower end ruled line 705, the page type of family register document is identified to be "non-head type".

In the written direction setting processing, the written direction may be set by discriminating the width and length of each item that includes text data. In this case, no database of the written directions corresponding to the item identification IDs of the items that include text data need be prepared, and the storage capacity of a storage medium such as the ROM 106 or the like can be saved.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer and receives the program code read out from the storage medium.

When the processing realized by the first embodiment of the present invention is applied to the storage medium, the storage medium stores program codes corresponding to the above-mentioned flow charts. As will be briefly described below, the respective modules shown in an example of the memory map in FIG. 37 or 38 are stored in the storage medium.

Figure 37:
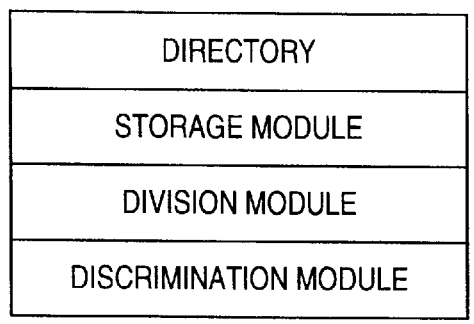
FIG. 37 is a view showing the structure of a memory map of a storage medium that stores program codes for realizing the first embodiment of the present invention.

More specifically, in FIG. 37, the program codes of at least a "storage module", "division module", and "discrimination module" need only be stored in the storage medium.

Note that the "storage module" stores format information associated with a predetermined format in the storage medium. The "division module" divides an original image having the predetermined format into a plurality of regions. The "discrimination module" checks the division result on the basis of the format information.

Figure 38:
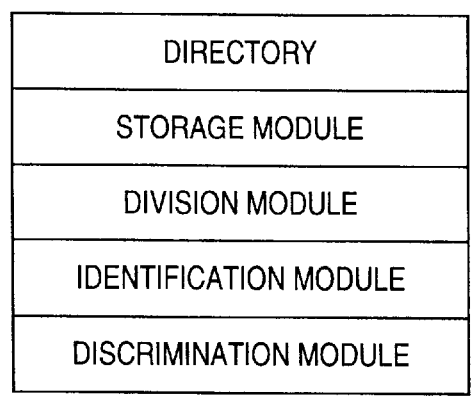
FIG. 38 is a view showing the structure of a memory map of a storage medium that stores program codes for realizing the first embodiment of the present invention.

On the other hand, in FIG. 38, the program codes of at least a "storage module", "division module", "identification module", and "discrimination module" need only be stored in the storage medium.

Note that the "storage module" stores format information of each of original images having a plurality of different predetermined formats in the storage medium. The "division module" divides an original image having the predetermined format into a plurality of regions. The "identification module" identifies the type of original image having the predetermined format on the basis of the features of the divided regions. The "discrimination module" checks the division result on the basis of the format information of the original image having the predetermined format corresponding to the identified type.

When the processing realized by the second embodiment of the present invention is applied to the storage medium, the storage medium stores program codes corresponding to the above-mentioned flow charts. As will be briefly described below, the respective modules shown in an example of the memory map in FIG. 39 are stored in the storage medium.

Figure 39:
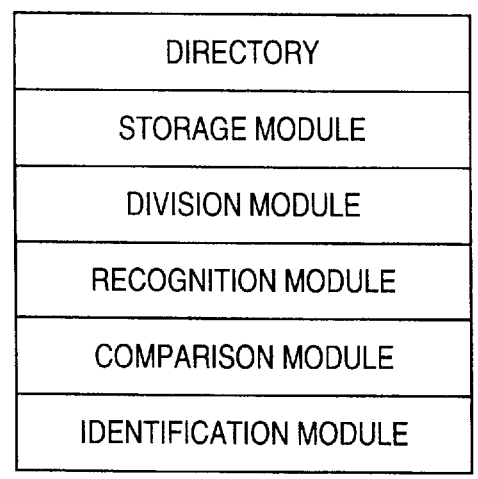
FIG. 39 is a view showing the structure of a memory map of a storage medium that stores program codes for realizing the second embodiment of the present invention.

More specifically, in FIG. 39, the program codes of at least a "storage module", "division module", "recognition module", "comparison module", and "identification module" need only be stored in the storage medium.

Note that the "storage module" stores format information including character information in predetermined regions of each of original images having a plurality of different predetermined formats. The "division module" divides an original image having the predetermined format into a plurality of regions. The "recognition module" recognizes characters present in the divided regions. The "comparison module" compares the recognition result with the character information. The "identification module" identifies the type of original image having the predetermined format on the basis of the comparison result.

When the processing realized by the third embodiment of the present invention is applied to the storage medium, the storage medium stores program codes corresponding to the above-mentioned flow charts. As will be briefly described below, respective modules shown in an example of the memory map in FIG. 40 or 41 are stored in the storage medium.

Figure 40:
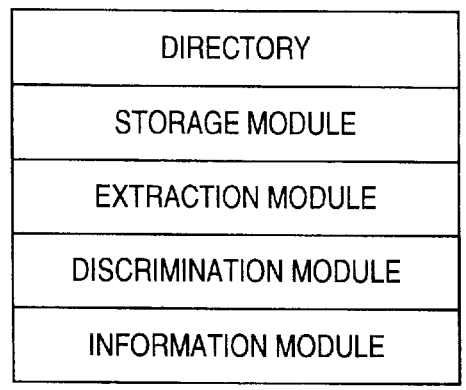
FIG. 40 is a view showing the structure of a memory map of a storage medium that stores program codes for realizing the third embodiment of the present invention.

More specifically, in FIG. 40, the program codes of at least a "storage module", "extraction module", "discrimination module", and "information module" need only be stored in the storage medium.

Note that the "storage module" stores format information associated with a predetermined format. The "extraction module" extracts ruled lines included in an original image having the predetermined format. The "discrimination module" checks the extraction result on the basis of the format information. The "information module" gives information based on the discrimination result.

Figure 41:
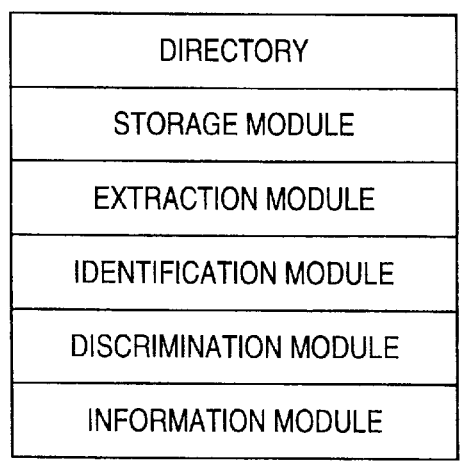
FIG. 41 is a view showing the structure of a memory map of a storage medium that stores program codes for realizing the third embodiment of the present invention.

On the other hand, in FIG. 41, the program codes of at least a "storage module", "extraction module", "identification module", "discrimination module", and "information module" need only be stored in the storage medium.

Note that the "storage module" stores format information associated with each of original images having a plurality of different predetermined formats. The "extraction module" extracts ruled lines included in an original image having the predetermined format. The "identification module" identifies the type of original image having the predetermined format on the basis of the features of the extracted ruled lines. The "discrimination module" checks the extraction result on the basis of the format information of the original image having the predetermined format corresponding to the identified type. The "information module" gives information based on the discrimination result.

When the processing realized by the fourth embodiment of the present invention is applied to the storage medium, the storage medium stores program codes corresponding to the above-mentioned flow charts. As will be briefly described below, the respective modules shown in an example of the memory map in FIG. 42 are stored in the storage medium.

Figure 42:
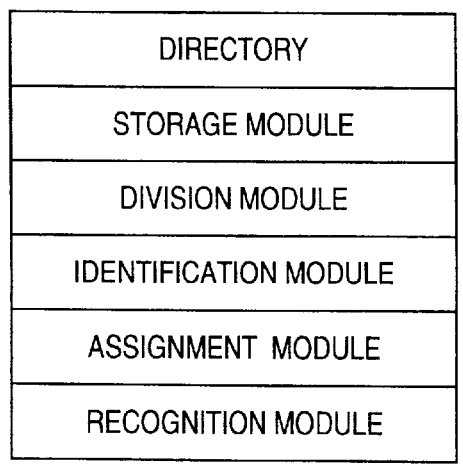
FIG. 42 is a view showing the structure of a memory map of a storage medium that stores program codes for realizing the fourth embodiment of the present invention.

More specifically, in FIG. 42, the program codes of at least a "storage module", "division module", "identification module", "assignment module", and "recognition module" need only be stored in the storage medium.

Note that the "storage module" stores format information associated with each of original images having a plurality of different predetermined formats. The "division module" divides an original image having the predetermined format into a plurality of regions. The "identification module" identifies the type of original image having the predetermined format on the basis of the features of the divided regions. The "assignment module" assigns format information of an original image having the predetermined format corresponding to the identified type to the divided region of the original image. The "recognition module" recognizes characters present in the regions assigned the format information.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
a format dictionary for storing format information associated with a predetermined format;
an input device for inputting an image;
a divider for dividing the input image into a plurality of regions;
determination means for determining features of the regions; and
a discriminator for automatically discriminating whether or not a result of the division has an error, on the basis of a comparison between the features of the regions and the format information.

2. The apparatus according to claim 1, wherein said format dictionary stores format information associated with each of a plurality of different predetermined formats, and further comprising an identifier for identifying a format type of the input image on the basis of the features of the regions, and wherein
said discriminator performs the discrimination on the basis of a comparison between the features of the regions and the format information of the identified format type.

3. The apparatus according to claim 2, wherein said discriminator performs the discrimination on the basis of a comparison between a part of the plurality of regions and the format information of the identified format type.

4. The apparatus according to claim 2, wherein said discriminator performs the discrimination on the basis of a comparison between a key region in the plurality of regions and the format information of the identified format type.

5. The apparatus according to claim 1, further comprising:
correction means for correcting an error in the division result, when a discrimination result of said discriminator indicates that the division result of said divider includes an error.

6. The apparatus according to claim 1, further comprising:
a display for displaying a result of the discrimination performed by said discriminator.

7. The apparatus according to claim 1, further comprising:
information means for providing message information indicating an error, when a discrimination result of said discriminator indicates that the division result of said divider includes an error.

8. The apparatus according to claim 1, wherein each of the regions is a rectangular region surrounded by ruled lines.

9. The apparatus according to claim 1, further comprising:
a display for displaying the region which may have caused an error in the division result to be distinguished from the regions free from the error in the division result, when a discrimination result of said discriminator indicates that the division result of said divider includes an error.

10. The apparatus according to claim 1, wherein said discriminator performs the discrimination on the basis of a comparison between a part of the plurality of regions and the format information.

11. The apparatus according to claim 1, wherein said discriminator performs the discrimination on the basis of a comparison between a key region in the plurality of regions and the format information.

12. An image processing method, comprising the steps of:
an input step of inputting an image;
a division step of dividing the input image into a plurality of regions;
a determination step of determining features of the regions; and
a discrimination step of automatically discriminating whether or not a result of the division has an error, on the basis of a comparison between the features of the regions and format information associated with a predetermined format stored in a format dictionary.

13. The method according to claim 12, wherein said format dictionary stores format information associated with each of a plurality of different predetermined formats, and further comprising an identification step of identifying a format type of the input image on the basis of the features of the regions, and wherein
the discrimination step performs the discrimination on the basis of a comparison between the features of the regions and format information of the identified format type.

14. The method according to claim 13, wherein said discrimination step performs the discrimination on the basis of a comparison between a part of the plurality of regions and the format information of the identified format type.

15. The method according to claim 13, wherein said discrimination step performs the discrimination on the basis of a comparison between a key region in the plurality of regions and the format information of the identified format type.

16. The method according to claim 12, further comprising:
a correction step of correcting an error of the division result when a discrimination result of the discrimination step indicates that the division result of the division step includes the error.

17. The method according to claim 12, further comprising:
a display step of displaying a result of the discrimination step.

18. The method according to claim 12, further comprising:
a step of providing message information indicating an error when a discrimination result of the discrimination step indicates that the division result of the division step includes the error.

19. The method according to claim 12, wherein each of the regions is a rectangular region surrounded by ruled lines.

20. The method according to claim 12, further comprising:
a display step of displaying the region which may have caused an error in the division result to be distinguished from the regions free from the error in the division result when a discrimination result of the discrimination step indicates that the division result of the division step includes the error.

21. The method according to claim 12, wherein said discrimination step performs the discrimination on the basis of a comparison between a part of the plurality of regions and the format information.

22. The method according to claim 12, wherein said discrimination step performs the discrimination on the basis of a comparison between a key region in the plurality of regions and the format information.

23. A computer readable memory that stores program codes for performing image processing, comprising:
program code for an input step of inputting an image;
program code for a division step of dividing the input image into a plurality of regions;
program code for a determination step of determining features of the regions; and program code for a discrimination step of automatically discriminating whether or not a result of the division has an error, on the basis of a comparison between the features of the regions and format information associated with a predetermined format stored in a format dictionary.

24. The computer readable memory according to claim 23, wherein said format dictionary stores format information associated with each of a plurality of different predetermined formats, and further comprising program code for an identification step of identifying a format type of the input image on the basis of the features of the regions, and wherein the program code for the discrimination step performs the discrimination on the basis of a comparison between the features of the regions and format information of the identified format type.

* * * * *

UNITED STATES PATENT AND TRADEMARK OFFICE
CERTIFICATE OF CORRECTION

PATENT NO. : 6,201,894 B1
DATED : March 13, 2001
INVENTOR(S) : Kazuyuki Saito

It is certified that error appears in the above-identified patent and that said Letters Patent is hereby corrected as shown below:

<u>Title page,</u>
Item [56], References Cited, OTHER PUBLICATIONS, in "Chang et al," "et al," should read -- et al., --; and "Rule-Based" should read -- "Rule-Based --; and "Segmentation," should read -- "Segmentation, --.

<u>Column 14,</u>
Line 45, " "本籍" (father) " should read -- "父" (father) --.

<u>Column 19,</u>
Line 52, "slde" should read -- side --.

<u>Column 20,</u>
Line 14, (close up left margin);
Line 15, (close up right margin).

<u>Column 24,</u>
Line 62, "wit h" should read -- with --.

<u>Column 25,</u>
Line 10, "keyword s" should read -- keywords --.

Signed and Sealed this

Seventeenth Day of September, 2002

*Attest:*

JAMES E. ROGAN
*Attesting Officer*   *Director of the United States Patent and Trademark Office*